US011235255B2

(12) United States Patent
McMullen et al.

(10) Patent No.: US 11,235,255 B2
(45) Date of Patent: Feb. 1, 2022

(54) INTERCHANGEABLE FACE HAVING MAGNETICALLY ADJUSTABLE FACIAL CONTOUR AND INTEGRAL EYELIDS

(71) Applicant: Realbotix, LLC, Las Vegas, NV (US)

(72) Inventors: Matthew McMullen, San Marcos, CA (US); Susan Pirzchalski, San Marcos, CA (US)

(73) Assignee: Realbotix. LLC, San Marcos, CA (US)

( * ) Notice: Subject to any disclaimer, the term of this patent is extended or adjusted under 35 U.S.C. 154(b) by 157 days.

(21) Appl. No.: 16/445,653

(22) Filed: Jun. 19, 2019

(65) Prior Publication Data

US 2019/0381414 A1 Dec. 19, 2019

Related U.S. Application Data

(60) Provisional application No. 62/686,862, filed on Jun. 19, 2018, provisional application No. 62/717,519, filed on Aug. 10, 2018.

(51) Int. Cl.
*A63H 3/40* (2006.01)
*A63H 3/48* (2006.01)
(Continued)

(52) U.S. Cl.
CPC .............. *A63H 3/40* (2013.01); *A63H 3/003* (2013.01); *A63H 3/28* (2013.01); *A63H 3/38* (2013.01);
(Continued)

(58) Field of Classification Search
CPC . A63H 3/365; A63H 3/38; A63H 3/40; A63H 3/42; A63H 3/003; A63H 3/28;
(Continued)

(56) References Cited

U.S. PATENT DOCUMENTS 1,648,418 A * 11/1927 Meiers ..................... A63H 3/40
446/343
2,148,888 A * 2/1939 Wittmann ................ A63H 3/40
446/342

(Continued)

OTHER PUBLICATIONS

International Search Report and Written Opinion for related PCT application No. PCT/US2019/037948, dated Sep. 30, 2019, in 12 pages.

*Primary Examiner* — Joseph B Baldori
(74) *Attorney, Agent, or Firm* — Procopio, Cory, Hargreaves & Savitch LLP

(57) ABSTRACT

This disclosure provides devices and methods for implementing a robotic doll head. An implementation of the doll head can have a face mask having a pair of integral eyelids and an eyeball actuation frame supporting a pair of moveable eye assemblies. Each moveable eye assembly can have an eyeball element and an eyelid actuator assembly. The eyelid actuator assembly can have an eyelid support that can be coupled to an interior surface of one integral eyelid of the pair of integral eyelids. The eyelid actuator assembly can have a drive band configured to magnetically couple to the eyelid support and move the drive band in an arcuate path to blink the integral eyelids. The moveable eye assemblies can be offset from a centerline of the doll head by a separation angle by the eyeball actuation frame.

12 Claims, 14 Drawing Sheets

(51) Int. Cl.
*A63H 3/00* (2006.01)
*A63H 3/28* (2006.01)
*B25J 9/16* (2006.01)
*A63H 33/26* (2006.01)
*A63H 3/38* (2006.01)

(52) U.S. Cl.
CPC ............... *A63H 3/48* (2013.01); *A63H 33/26* (2013.01); *B25J 9/1697* (2013.01); *A63H 2200/00* (2013.01)

(58) Field of Classification Search
CPC ...... A63H 3/48; A63H 33/26; A63H 2200/00; B25J 9/1697
USPC .......................................... 446/391, 392, 393
See application file for complete search history.

(56) References Cited

U.S. PATENT DOCUMENTS

| | | | | |
|---|---|---|---|---|
| 2,660,830 | A * | 12/1953 | Jentzen | A63H 3/40 446/342 |
| 2,856,730 | A * | 10/1958 | Bashover | A63H 3/40 446/346 |
| 2,904,928 | A * | 9/1959 | Bashover | A63H 3/40 446/342 |
| 3,006,110 | A * | 10/1961 | Neff | A63H 3/40 446/342 |
| 3,043,051 | A * | 7/1962 | Beebe | A63H 3/40 446/342 |
| 3,086,318 | A * | 4/1963 | Brudney | A63H 3/40 446/342 |
| 3,091,893 | A * | 6/1963 | Brudney | A63H 3/40 446/344 |
| 3,616,572 | A * | 11/1971 | Kosicki | A63H 3/40 446/346 |
| 3,660,932 | A * | 5/1972 | Raffeli | A63H 3/40 446/346 |
| 4,409,754 | A * | 10/1983 | Moreau | A63H 3/40 446/392 |
| 4,900,289 | A | 2/1990 | May et al. | |
| 5,108,341 | A * | 4/1992 | DeSmet | A63H 3/48 446/299 |
| 5,782,669 | A * | 7/1998 | Hornsby | A63H 3/40 446/342 |
| 6,220,923 | B1 * | 4/2001 | Lin | A63H 3/40 446/343 |
| 6,264,521 | B1 | 7/2001 | Hernandez | |
| 6,544,094 | B1 * | 4/2003 | Maddocks | A63H 3/365 446/175 |
| 6,875,074 | B1 | 4/2005 | Morris et al. | |
| 7,186,212 | B1 | 3/2007 | McMullen | |
| 7,234,989 | B2 * | 6/2007 | Maddocks | A63H 3/38 446/343 |
| 7,641,535 | B2 * | 1/2010 | Maddocks | A63H 3/42 446/392 |
| 8,007,340 | B2 * | 8/2011 | Sip | A63H 3/38 446/392 |
| 8,062,092 | B2 * | 11/2011 | Yang | A63H 3/40 446/337 |
| 8,251,769 | B2 * | 8/2012 | Cao | A63H 3/40 446/343 |
| 8,303,368 | B2 * | 11/2012 | Li | A63H 3/40 446/343 |
| 8,888,553 | B2 * | 11/2014 | McMullen | A63H 3/365 446/321 |
| 9,474,981 | B1 * | 10/2016 | Forti | A63H 13/005 |
| 9,776,097 | B2 * | 10/2017 | Smoot | A63H 3/40 |
| 2003/0110540 | A1 | 6/2003 | Fukui et al. | |
| 2008/0293325 | A1 * | 11/2008 | Lei | A63H 3/28 446/301 |
| 2010/0099328 | A1 * | 4/2010 | Wang | A63H 3/445 446/342 |
| 2011/0177753 | A1 | 7/2011 | Irmler et al. | |
| 2016/0193536 | A1 * | 7/2016 | Mansilla Gonzalez | A63H 3/40 446/392 |
| 2021/0093980 | A1 * | 4/2021 | Todo | A63H 13/005 |

* cited by examiner

INTERCHANGEABLE FACE HAVING MAGNETICALLY ADJUSTABLE FACIAL CONTOUR AND INTEGRAL EYELIDS

CROSS-REFERENCE TO RELATED APPLICATIONS

This application claims priority to U.S. Provisional Application 62/686,862 filed Jun. 19, 2018, entitled, "INTERCHANGEABLE FACE HAVING MAGNETICALLY ADJUSTABLE FACIAL CONTOUR AND INTEGRAL EYELIDS," and U.S. Provisional Application 62/717,519 filed Aug. 10, 2018, entitled, "ROBOT EYEBALL WITH INTEGRAL CAMERA," the contents of which are hereby incorporated by reference in their entirety.

BACKGROUND

Technical Field

This disclosure generally relates to robotic or animatronic doll heads. More particularly, this disclosure relates to doll heads having an adjustable facial contour, including integral eyelids.

Related Art

The head of a doll can have features characteristic of a human or animal for example. In some examples however, facial features of the doll head are static and immobile. That is, the facial expression of the doll head is invariable and cannot readily change to express joy, surprise, amazement, confusion, anger, fear and other emotions. Such static doll head designs rarely retain the user's interest.

Some doll head designs can have interchangeable parts, such as hair and lips, so as to change the appearance of the doll head. However, these interchangeable parts are cumbersome and time-consuming to deploy because the parts must first be removed and then exchanged with other parts. These designs may not be suitably lifelike and fail to command attention as they may be perceived as obviously fake.

SUMMARY

An aspect of the disclosure provides a moveable eye assembly for a doll head having an eyeball element. The moveable eye assembly can have an integral eyelid formed as a unitary component of a face mask for the doll head. The moveable eye assembly can have an eyelid support configured to receive the integral eyelid. The eyelid support can have an eyelid support frame having an annular sector shape, spanning a portion of the eyeball element, the eyelid support frame having a plurality of eyelid support connectors. The eyelid support can have an eyelid support shroud coupled to the eyelid support frame, the eyelid support shroud having shape similar to contours of the eyeball element and supporting an outward appearance of the integral eyelid.

Another aspect of the disclosure provides a doll head. The doll head can have a face mask having a pair of integral eyelids. The doll head can have an eyelid support coupled to an interior surface of each integral eyelid of the pair of integral eyelids. The doll head can have a pair of eyelid actuator assemblies having a drive band configured to magnetically couple to the eyelid support and move the drive band in an arcuate path to blink the pair of integral eyelids.

Another aspect of the disclosure provides a doll head. The doll head can have a face mask having a pair of integral eyelids. The doll head can have a pair of moveable eye assemblies. The moveable eye assemblies can have an eyeball element. The moveable eye assemblies can have eyelid actuator assembly. The eyelid actuator assembly can have an eyelid support configured to be coupled to an interior surface of one integral eyelid of the pair of integral eyelids. eyelid actuator assembly a drive band configured to magnetically couple to the eyelid support and move the drive band in an arcuate path to blink the pair of integral eyelids. The doll head can have an eyeball actuation frame coupling the pair of moveable eye assemblies, each moveable eye assembly being offset from a centerline of the doll head by a separation angle.

Other aspects and advantages will become apparent to one of ordinary skill with a review of the following disclosure.

BRIEF DESCRIPTION OF THE DRAWINGS

The details of embodiments of the present disclosure, both as to their structure and operation, can be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description can have specific details for the purpose of providing a thorough understanding of the embodiments. However, it will be apparent to those skilled in the art that the disclosure without these specific details. In some instances, well-known structures and components are shown in simplified form for brevity of description.

This disclosure relates to fully articulated facial features, expressions, and eye movement that can result in a more realistic or lifelike appearance. Interchangeable features to include entire facial structures can provide flexibility to change a doll head's appearance. Interchangeable faces with integral eyelids, for example, can further increase the lifelike appearance, eliminating gaps between eye socket and mechanical eye. Facial expressions, and eye movement, including blinking can be controlled via actuators and/or one or more magnets to improve realism of the doll.

Figure 1:
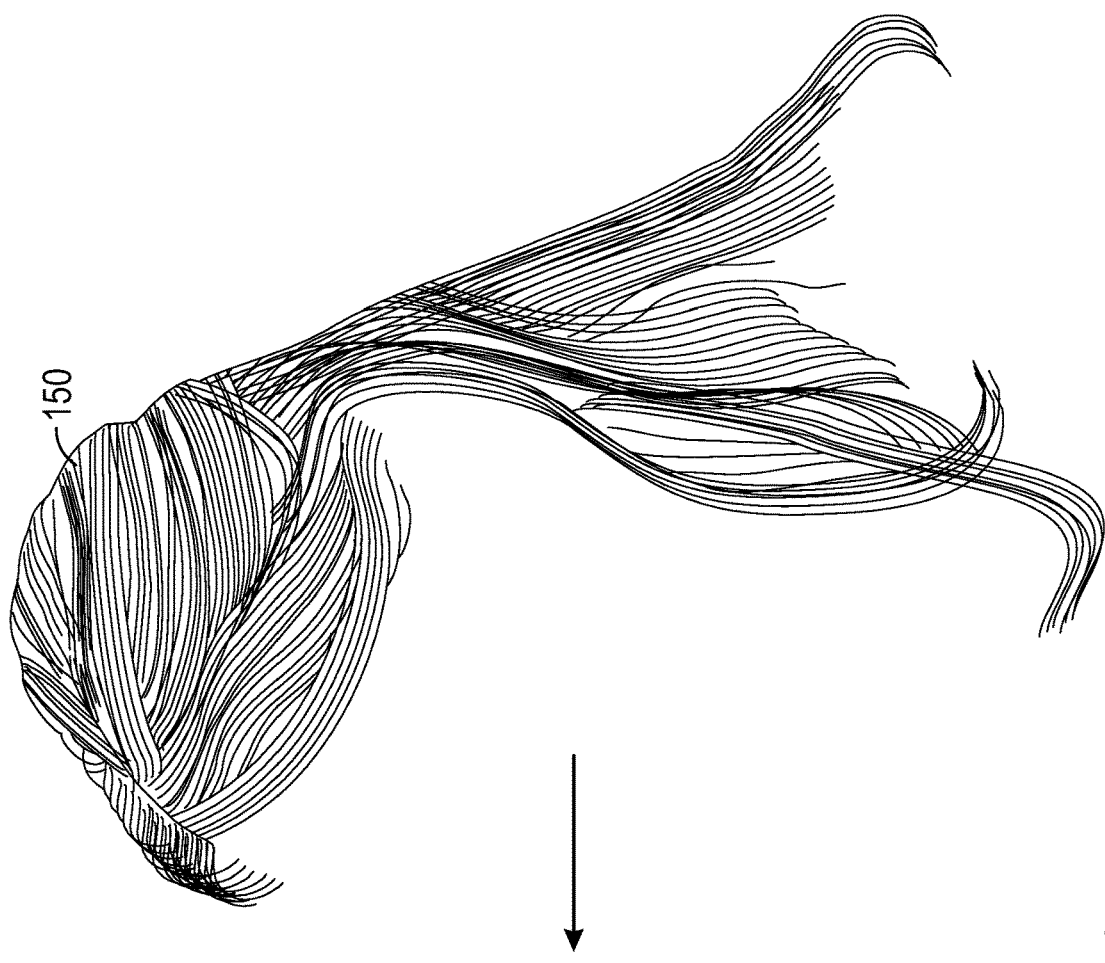
FIG. 1 is an exploded view of an embodiment of a doll head.
Figure 1:
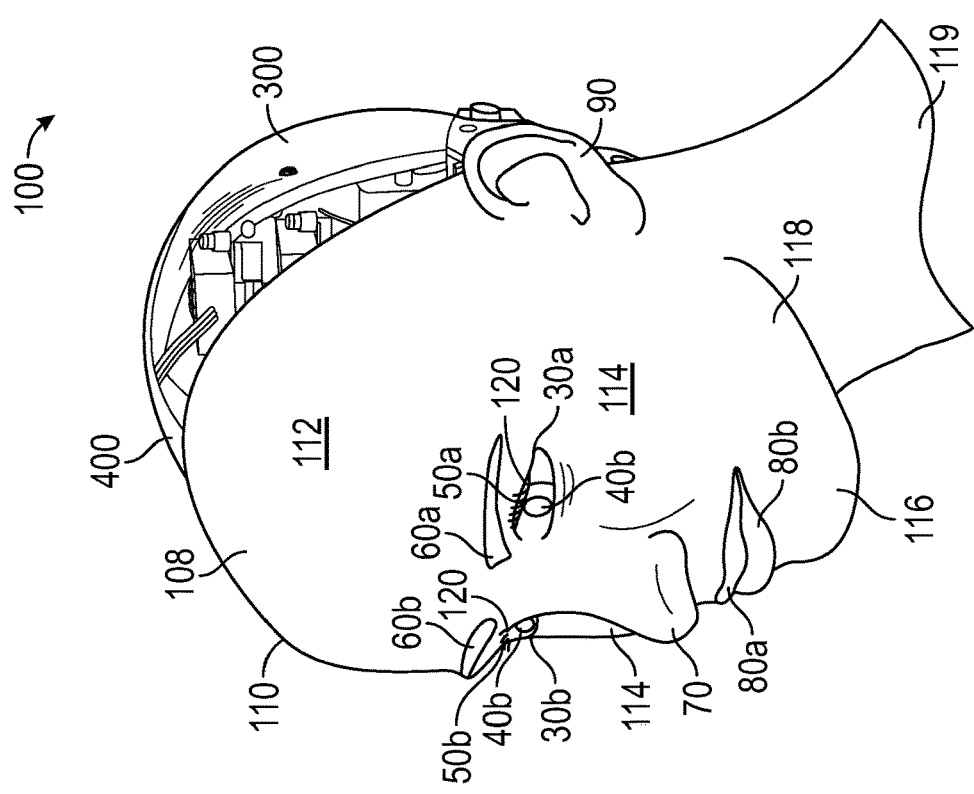

FIG. 1 is an exploded view of an embodiment of a doll head. A doll head 100 can be an assembly (e.g., a doll head assembly) of multiple parts that simulate a human head. In some implementations, the doll head 100 can have, for example, a face mask 110, a skull assembly 400, and a wig 150. The doll head 100 is shown in this exploded view with the wig 150 separated from the rest of the doll head 100, including the face mask 110, the skull assembly 400 (FIG. 4), and a rear skull portion 300. The face mask 110 can have a pair of spaced-apart eye openings 30a and 30b (collectively eye openings 30) for accommodating a corresponding pair of movable eye elements 40a and 40b, as described in more detail below. Surrounding the pair of eye openings 30a and 30b and attached to the face mask 110 is a respective pair of eyelids 120 and eyelashes 50a and 50b. The eyelids may be referred to herein collectively as the eyelids 120 or singularly as an eyelid 120. A pair of spaced-apart eyebrows 60a and 60b (collectively eyebrows 60), can be attached to the face mask 110. The eyebrows 60 can individually be associated with and disposed above their respective pair of eye openings 30a and 30b. The face mask 110 can also have a nose 70 and a pair of separable lips 80a and 80b (collectively, lips 80). The lip 80a can be referred to as an upper lip 80a. The lip 80b can be referred to as a lower lip 80b. The face mask 110 can have a pair of ears 90 (only one of which is shown), an exterior surface 108 and an interior volume 310 (see FIG. 3).

The face mask 110 can include an elastically deformable forehead region 112, two elastically deformable cheek regions 114, an elastically deformable chin region 116 and an elastically deformable jaw region 118. The face mask 110 can have a neck portion 119 disposed below and integrally formed with jaw region 118. The wig 150 can be removably coupled to rear skull portion 300 and/or the face mask 110. The shape of eye openings 30, the nose 70, the lips 80, forehead region 112, cheek regions 114, chin region 116 and jaw region 118 and the texture of wig 150, in addition to the color (e.g., skin tone) of the face mask 110, are chosen to simulate any one of a plurality of human genotypes.

In some embodiments, the face mask 110 can be elastically deformable. In this regard, the face mask 110 can be formed of a relatively thin gauge resilient, flexible or elastomeric (e.g., rubber-like) deformable material, such as natural latex, synthetic latex (i.e., styro butane rubber), silicone rubber, or other suitable elastomeric material. In the case of natural latex, the natural latex material may comprise polymerized isoprene. Also, in the case of synthetic latex, the synthetic latex material may comprise polymerized monomers including isoprene, butadiene, chloroprene and/or isobutylene. In the case of silicone rubber, the silicone rubber may be a tin-catalyzed, condensation cured (e.g., cured in a controlled humidity environment) composition. More specifically, the composition of the silicon rubber may comprise suitable proportions of silicon, carbon, hydrogen and oxygen. Alternatively, "medical grade" or platinum-catalyzed silicon, which is less susceptible to tears, compression marks and shrinkage compared to tin-catalyzed silicon rubber, may be used as the material forming the face mask 110. In this case, the medical grade or platinum-catalyzed silicon is non-toxic and compliant with U.S. Food and Drug Administration Class VI certification standards. Either in the form of tin-catalyzed or platinum-catalyzed silicon, silicon rubber can be beneficially used for the face mask 110 because silicon rubber is odorless, tasteless, reduces risk of staining and corroding other materials that may contact the face mask 110 and does not support bacteria growth. Although silicon rubber may be more expensive than latex, silicon rubber may be preferred over latex for use as a material for the face mask 110 for the reasons recited above and because latex may cause an allergic reaction in some individuals.

In some embodiments, the elastomeric material forming the face mask 110 should be durable as well as flexible or elastic. In this regard, by way of example only and not by way of limitation, the face mask 110 may have an average thickness of approximately 25 gauge or 0.55 millimeter (0.021653 inch). In some implementations, the face mask 110 can be 0.25" to 0.5" thick on average. However, the face mask 110 can have certain areas that are even thicker to approximate appropriate tissues. For example, the cheek regions 114 can be thicker than forehead region 112. Also, by way of example only and not by way of limitation, the latex or silicon elastomer comprising the face mask 110 should have a relatively high tear strength (e.g., approximately 250 pounds per square inch), high tensile strength (approximately 1,500 pounds per square inch), reasonable elongation (e.g., approximately 1.250% before permanent deformation occurs), low compression and a durometer range of between approximately five and approximately 80 as measured by the Shore A hardness test.

In some embodiments, the face mask 110 can have eyelids 120 and eyelashes 50 (shown as eyelashes 50a, 50b). Each of the eyelashes 50a, 50b can have an upper and lower set of eyelashes as on a human face. The eyelashes 50 and the eyebrows 60 can be secured in-place by a suitable non-toxic adhesive, such as a non-toxic rubber adhesive. The eyelashes 50, the eyebrows 60, and the wig 150 can include human hair, animal hair (e.g., horse hair) or a non-toxic synthetic fiber simulating human hair, such as an acrylic or a polyester synthetic fiber. In some implementations, the eyelashes 50 and the eyebrows 60 can be formed within the face mask 110. Alternatively, the eyelashes 50, the eyebrows 60, and/or the wig 150 may be painted on the face mask 110 rather than being disposed on or within the face mask 110 as actual human hair, animal hair or synthetic fiber.

As described in more detail below, the eyelids 120 can be an integral portion (e.g., integral eyelids) of the exterior surface 108. See the below description of FIG. 3.

The face mask 110 can be adapted to elastically move, deform or stretch to portray facial expressions. Elastic movement, deformation or stretching of the face mask 110 is achieved by movement of various magnets and magnetic couplings, as described below. Any human-like expressions or emotions capable of being exhibited by the face mask 110 are also possible, such as pleasure, surprise, puzzlement, fear, happiness, and sadness. It may be appreciated that alteration of any of the human-like expressions caused by controlled elastic deformation of the face mask 110 may necessarily result in creation of a plurality of wrinkles in the face mask 110 in order to enhance realistic display of human-like expression or emotion. For example, the aforesaid elastic deformation may cause brow wrinkles in forehead region 112, eye wrinkles near eye openings 30, cheek wrinkles in cheek region 114 and chin wrinkles in chin region 116. In addition, controlled elastic deformation of the face mask 110 can cause lips 80 to separate, so that lips 80 move from a closed position to an open position. Hence, as previously mentioned, controlled elastic deformation of the face mask 110 allows movement of the face mask 110 to provide controlled elastic deformation of the face mask 110 to form expressions of the face mask 110/doll head 100.

Figure 2:
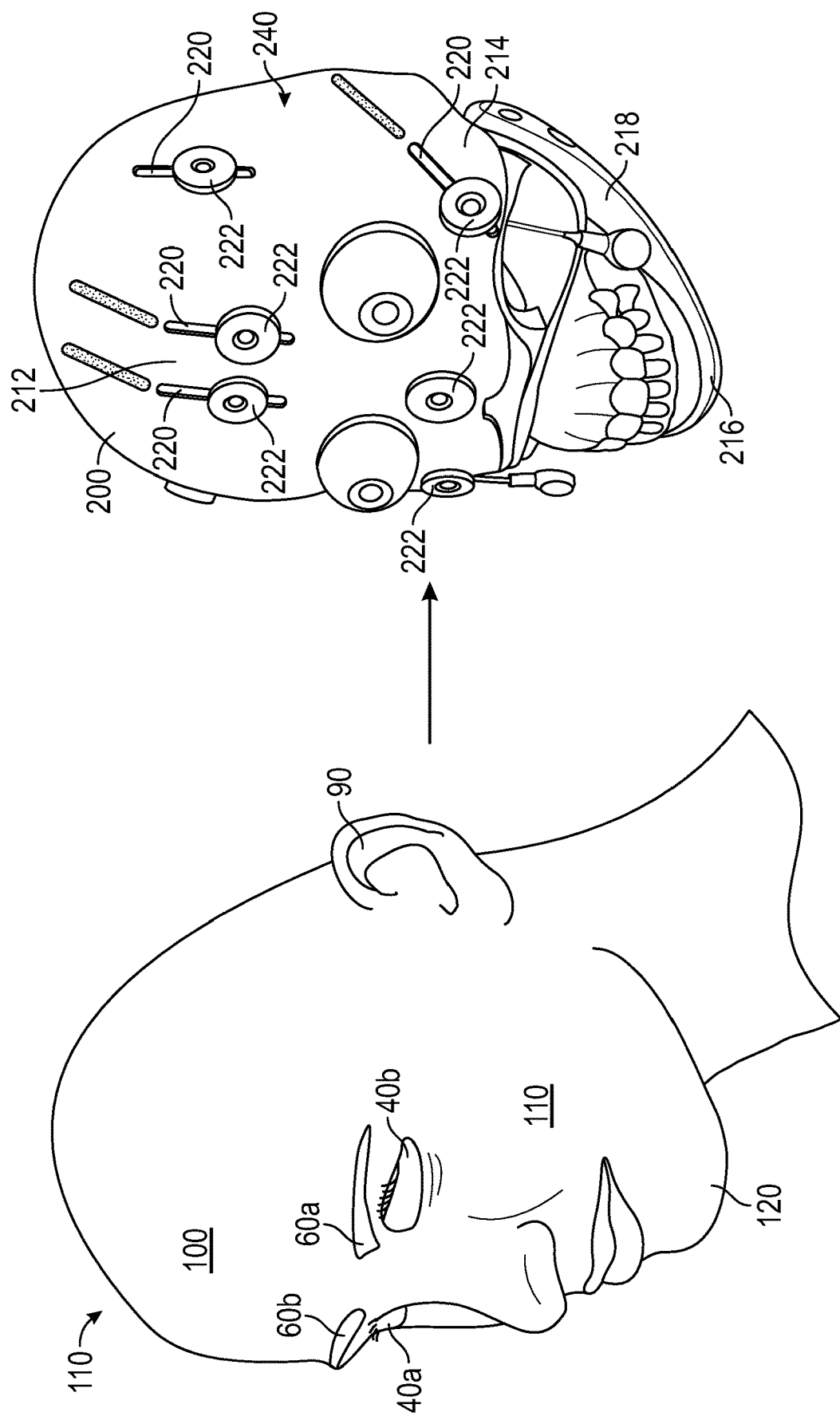
FIG. 2 is another exploded view of the embodiment of the doll head of FIG. 1.

FIG. 2 is another exploded view of the embodiment of the doll head of FIG. 1. The doll head 100 can have the face mask 110 coupled to a face mask support 200 via a plurality of magnets as described below. The face mask support 200 can be a part of the skull assembly 400 (FIG. 4). The face mask support 200 can have a plurality of magnets 222. The magnets 222 can receive corresponding magnets 322 (FIG. 3) disposed on the interior of the face mask 110. The face mask 110 can then be magnetically coupled to the face mask support 200 and/or the skull assembly 400 (FIG. 4). The wig 150 can be coupled to the skull assembly 400 via, for example, friction, magnets, or other fasteners (e.g., hook and loop fasteners). In some embodiments, there may be only one magnetic surface. For example, some embodiments may not have the magnets 222, or the magnets 222 may instead implement a ferromagnetic material to ensure magnetic coupling between the face mask 110 and the mace mask support 200. Thus, the magnets 322 (FIG. 3) may be magnetically coupled to one or more metal or ferromagnetic elements on the face mask support 200 instead of the magnets 222. Alternatively, the magnets 322 can be replaced with a non-magnetic metallic material to which the magnets 222 can magnetically couple.

The face mask support 200 can be shaped to be matingly received in the interior volume 310 (FIG. 3) of the face mask 110. The face mask support 200 can be durable as well as rigid. In this regard, the face mask support 200 is formed from a high-impact durable material, such as a polymer plastic, epoxy, wood, or light-weight metal in order to withstand normal handling by a user of the doll head 100.

The face mask support 200 can support the face mask 110 thereon when the face mask 110 is mounted on the face mask support 200. For example, the face mask support 200 can have a forehead region 212, two cheek regions 214 (only one of which is shown), a chin region 216 and a jaw region 218 for respectively supporting the corresponding forehead region 112, cheek regions 114, chin region 116 and jaw region 118 of the face mask 110. The face mask support 200 can have a plurality of slots 220 allowing movement of the plurality of the magnets 222 there through. The slots 220 can accommodate, for example, connective components mechanically coupling the magnets 222 to respective actuators, or actuating assemblies. Predetermined ones of slots 220 may be linear or any desired shape. In this regard, predetermined ones of slots 220 may be shaped to curve in an arc (not shown) or a "U" or an "S" shape (also not shown) or any curvilinear shape depending on the desired facial expression to be obtained. For example, each of a pair of slots 220 may be located on opposite sides of lips 80 to affect a smile or frown.

The magnets 222 may be fixed or stationary on exterior surface 240 of the face mask support 200, as shown. A purpose of such fixed or stationary magnets 222 can be to allow easy removal or connection of the face mask 110 to the face mask support 200 and not to cause movement in the face mask 110.

Figure 3:
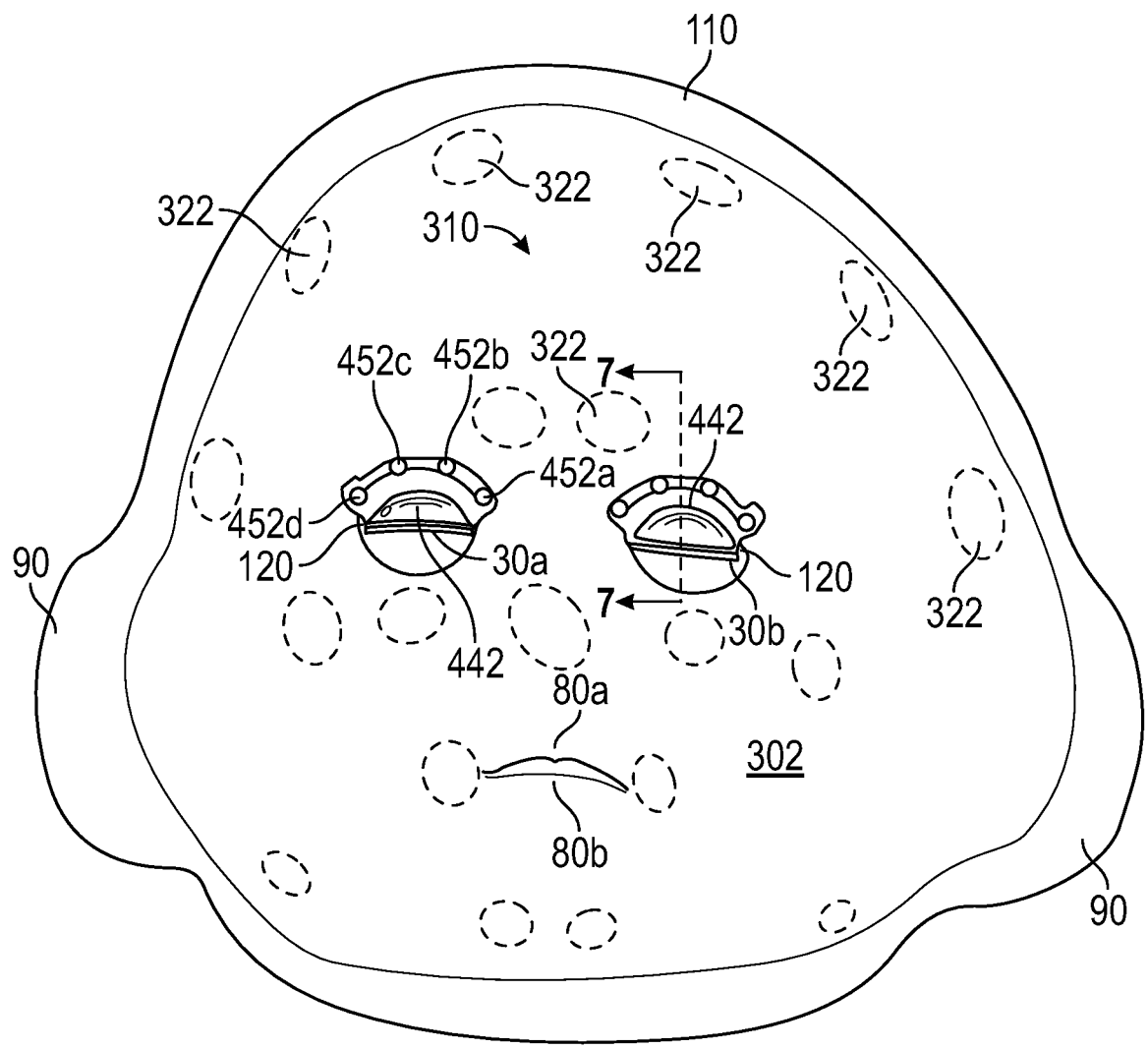
FIG. 3 is a graphical depiction of the interior of the face mask of FIG. 1 and FIG. 2.
Figure 4:
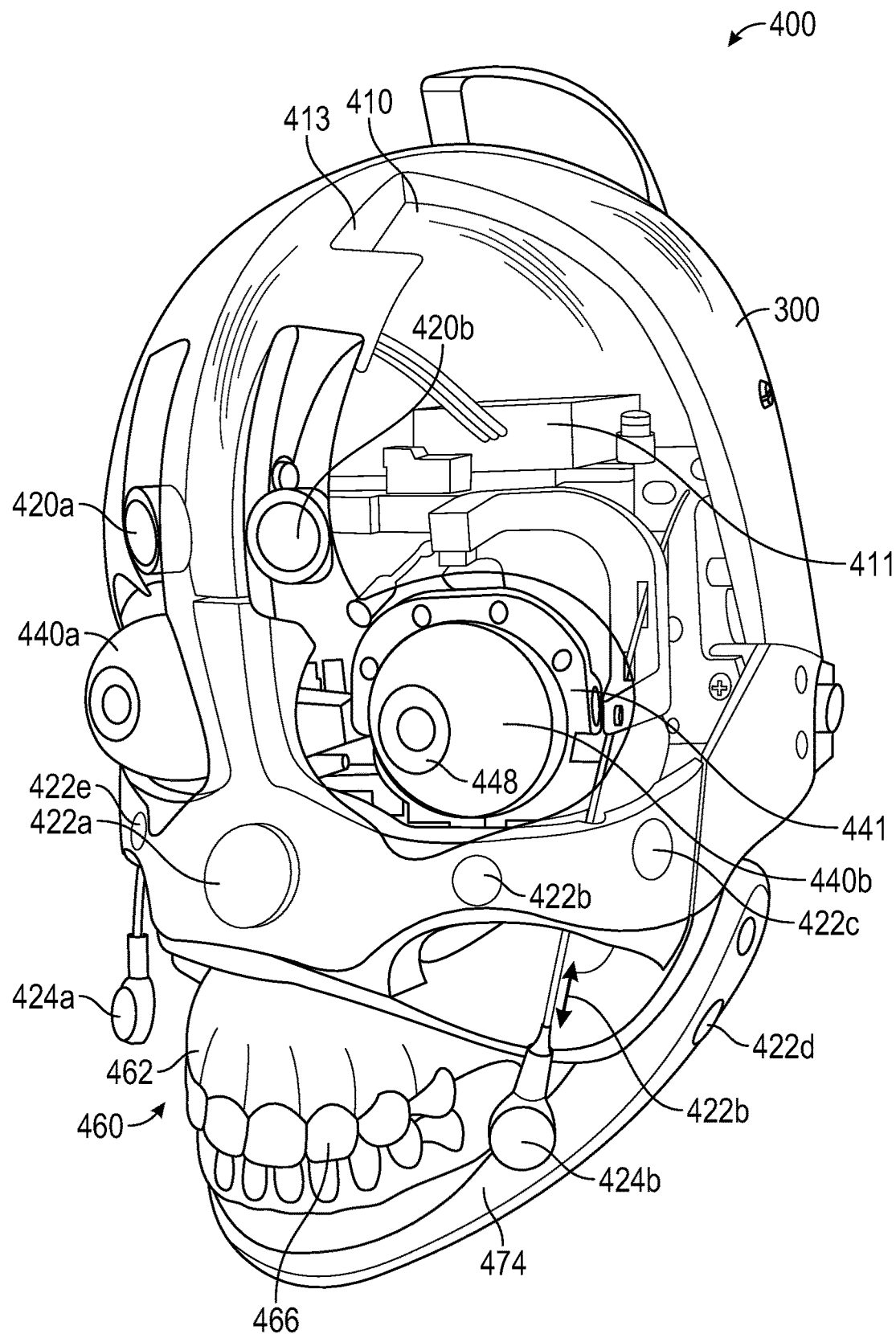
FIG. 4 is a graphical representation of an embodiment of a skull assembly for the doll head of FIG. 1.

FIG. 3 is a graphical depiction of the interior of the face mask of FIG. 1 and FIG. 2. The face mask 110 can have an interior surface 302 defining the interior volume 310. The interior surface 302 can further have a plurality of magnets 322, indicated in dashed lines. Only a portion of the magnets 322 are labeled for clarity. The plurality of magnets 322 can be affixed to or captured within the interior surface 302 by any suitable means. The magnets 322 can be adhered (e.g., via an adhesive) or formed within the interior surface 302. More specifically, each of the magnets 322 is disposed at a predetermined location on interior surface 302 to match or mate with corresponding magnets 222 on the face mask support 200. The predetermined location is selected so as to be where elastic deformation of the face mask 110 is desired in order to transform facial contours to form facial expressions exhibited by the face mask 110 as desired.

For example, at least one magnet 222 can be disposed near each of forehead region 112, cheek region 114 and lips 80. There may be any number of magnets 322 disposed at various predetermined locations on the interior surface 302 depending on the desired complexity and detail of expression to be displayed by the face mask 110. Based on the teachings herein, it may be appreciated by a person of ordinary skill in the art of doll design that portions of the face mask 110 will move as any of magnets 322 moves in order to vary the facial expression of the doll head 100.

In some embodiments, the plurality of magnets 322 within the interior surface 302 can be oriented in an opposite polarity to that of the magnets 222 on the face mask support 200 for establishing an attractive magnetic force between magnets 322 and magnets 222. Thus the magnets 322, can magnetically couple the face mask 110 to the face mask support 200. The attractive magnetic force established between magnets 322 and magnets 222 serves a dual purpose. First, when the magnets 322 and the magnets 222 contact each other, the attractive magnetic force between them causes magnets 322 and magnets 222 to connect to each other. Thus, the face mask 110 is securely mounted on the face mask support 200. The face mask 110 can be removed from the face mask support 200, when desired, by manually exerting sufficient force to overcome the magnetic attraction and thereby separate magnets 322 and magnets 222. The ability to connect and separate magnets 322 and magnets 222 in this manner allows the face mask 110 to be removably mounted on the face mask support 200. Secondly, the attractive magnetic force forms expressions the face mask 110 as the magnets 222 are moved according to individual actuators (see FIGS. 1 and 2).

Figure 6:
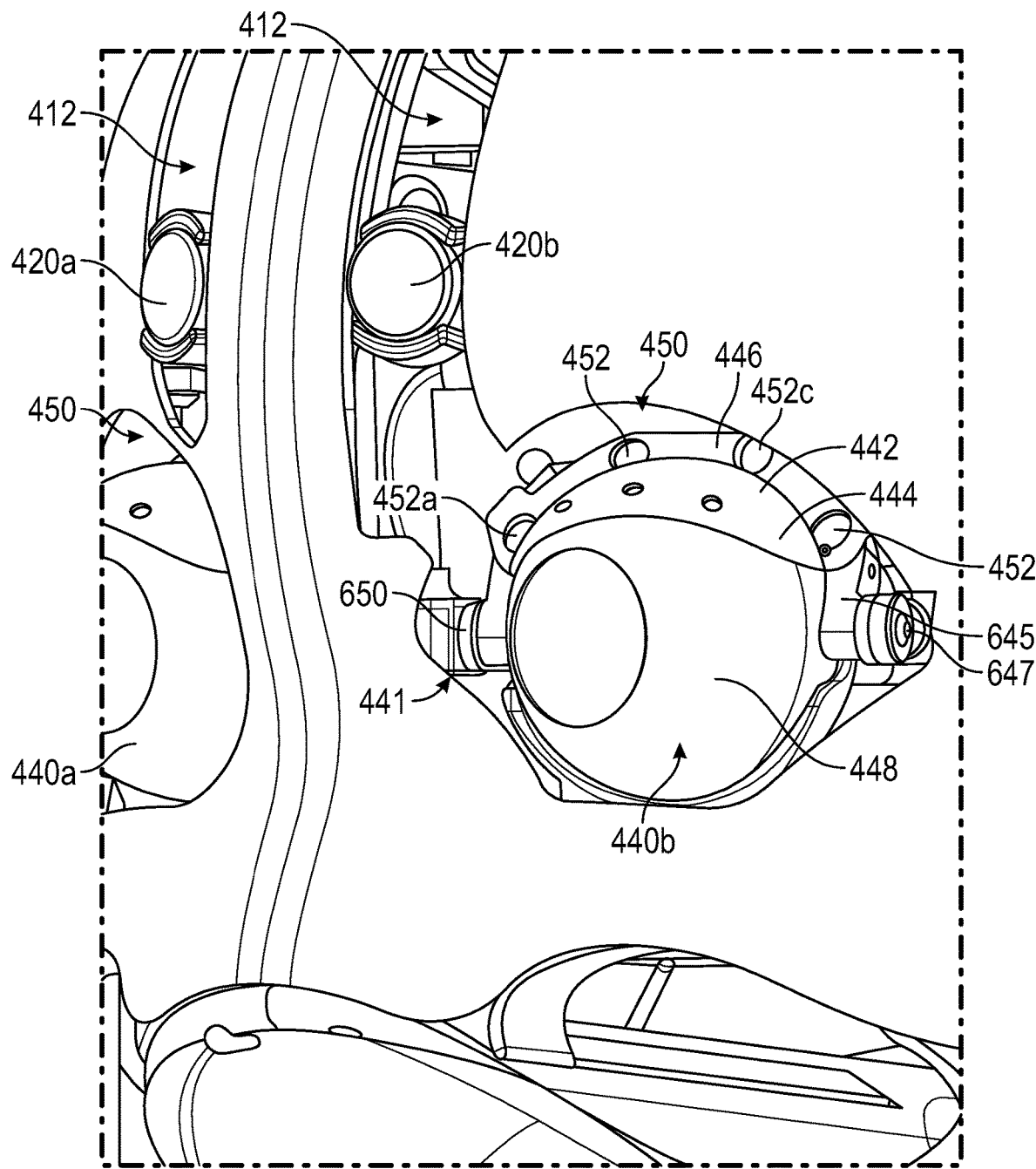
FIG. 6 is a close up view of a portion of the skull assembly of FIG. 4 and FIG. 5.

The face mask 110 can further have an eyelid support 442 affixed or otherwise adhered to each of the integral eyelids 120. The eyelid support(s) 442 can provide shape to the integral eyelids 120. The integral eyelids 120 increase the realization or realistic look of the doll head 100, in part by eliminating the space between the top of the eyes, the forehead region 112, and the cheek regions 114 to make a continuous surface from the forehead to the eyelids 120, for example. Thus the eyelids 120 can be a portion of a continuous surface of the face mask 110, extending from forehead region 112, the cheek regions 114, and an eyebrow region of the face mask 110. The eyelid support 442 can be magnetically coupled to an eyelid actuator assembly 441 (FIG. 6). The combination of the integral eyelid 120, the eyelid support 442, and the eyelid actuator assembly 441 can be referred to as an eyelid assembly.

FIG. 4 is a graphical representation of an embodiment of a skull assembly for the doll head of FIG. 1. In some implementations a skull assembly 400 can have similar features to the face mask support 200 (FIG. 2) and the rear skull portion 300 (FIG. 1).

The skull assembly 400 can have a cover portion 410. The cover portion 410 can be a hard plastic cover, protecting electronics 411 housed within the rear skull portion 300. The cover portion 410 can cover all or a portion of the forehead region 212 of the facemask support 200 (FIG. 2) and temple areas of the skull assembly 400. The cover portion 410 can form a portion of the face mask support 200, for example, providing areas of rigid support for the face mask 110. The cover portion 410 can further have slots, or cutouts 412 in appropriate areas to provide space for movement of two movable eye assemblies 440, for example. In some implementations, and as shown in FIG. 4, the cover portion 410 can be a transparent cover (as shown) formed from plastic or other transparent polymers supported by an frame 413 underlying the cover portion 410. The view shown in FIG. 4 includes a view of the interior portion of the skull assembly 400, looking through the (transparent) cover portion 410. The cover portion 410 may not cover the entire skull assembly (e.g., the face of the doll head 100) as the certain cutouts 412 may be present to allow various elements such as the magnets 420 to move. In some embodiments, the cover portion 410 can also be translucent or opaque.

Figure 10:
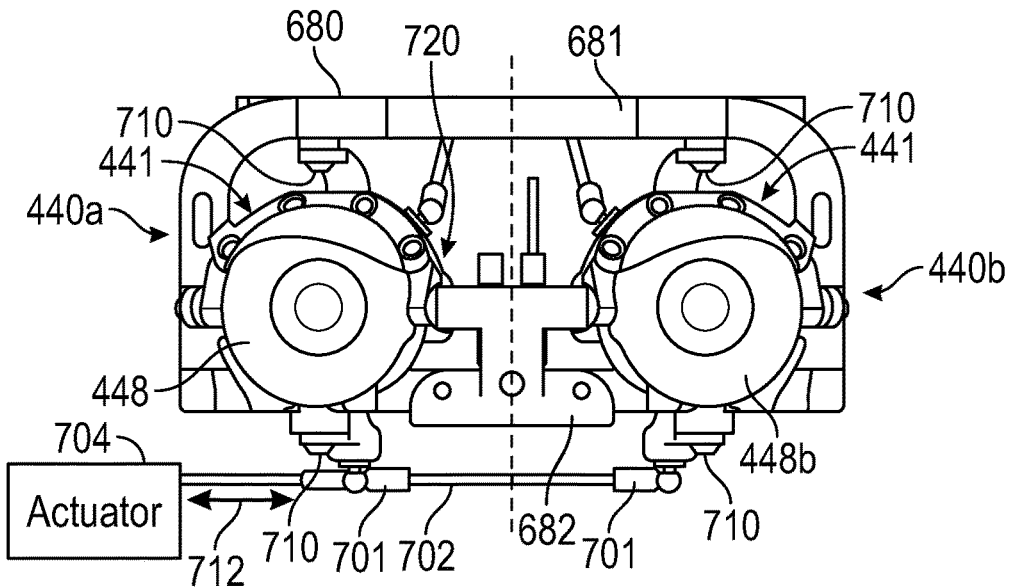
FIG. 10 is a front elevation view the moveable eye assemblies of FIG. 6.

Two moveable eye assemblies 440 are shown and labeled individually as moveable eye assemblies 440a, 440b. Each moveable eye assembly 440 can have the eyelid actuator assembly 441, an eyeball assembly 800 (FIG. 16), and an eyeball gimbal assembly (FIG. 10).

The skull assembly 400 can have a plurality of expression magnets 420 (shown as 420a, 420b). The expression magnets 420 can be a subset of the magnets 222, for example. The expression magnets 420 can be moved by various associated actuators within the skull assembly 400 to form facial expressions in the face mask 110.

The skull assembly 400 can further have securing magnets 422. The securing magnets 422 are labeled individually as 422a, 422b, 422c, 422d, 422e. The securing magnets 422 can also be a subset of the magnets 222, for example. Only five securing magnets 422 are labeled in this view. It will be appreciated that any number of securing magnets 422 may be possible as needed to secure the face mask 110 to the skull assembly 400 (e.g., the face mask support 200).

The skull assembly 400 can have smile magnets 424 (shown as 424a, 424b). The smile magnets 424 can be a subset of the magnets 222, for example. The smile magnets 424 can be moved by associated actuators in a direction indicated with arrows (direction) 426 to form or change the facial expression displayed on the face mask 110. For example, the smile magnets 424 can be moved to form a smile or frown in the face mask 110.

Figure 5:
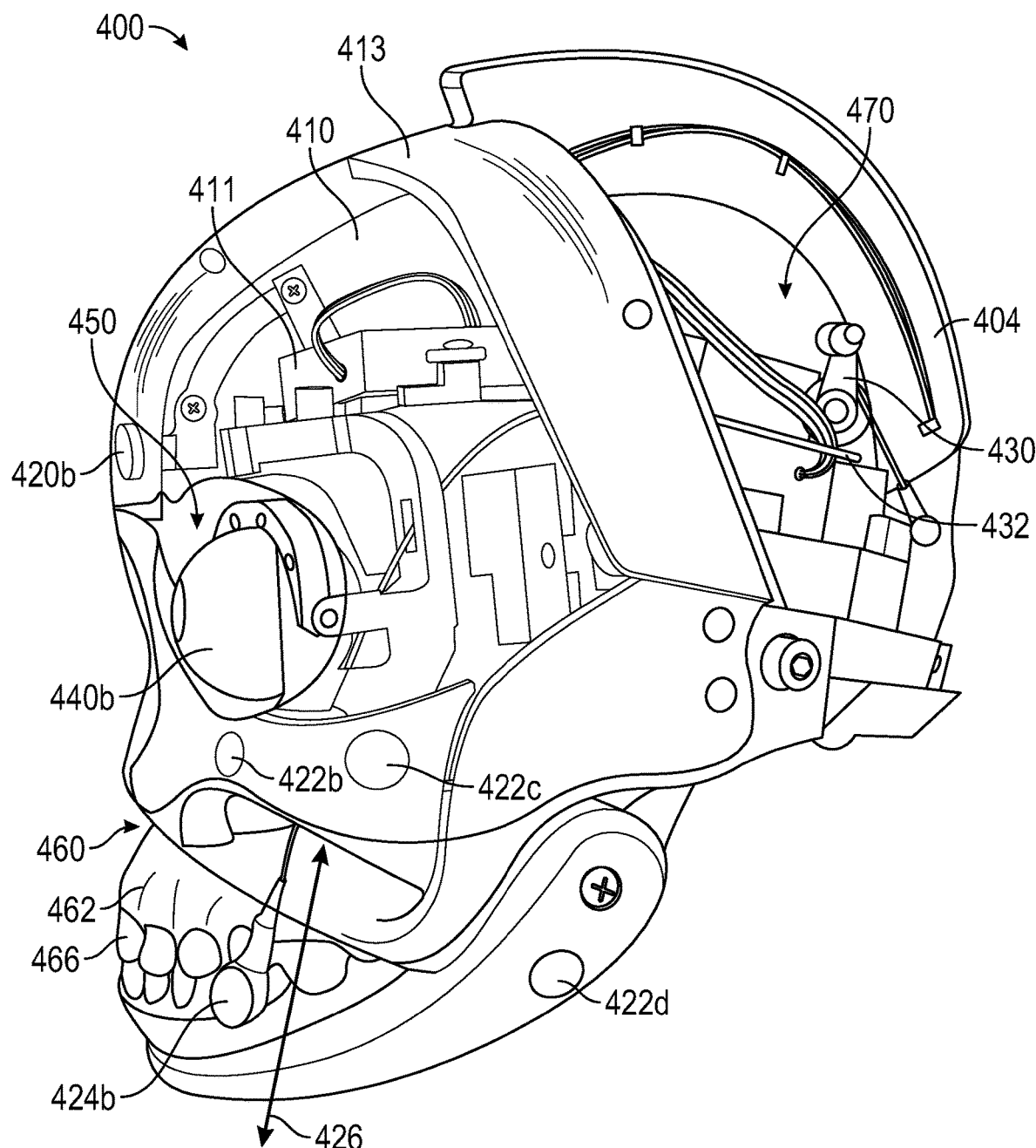
FIG. 5 is a profile view of the embodiment of the skull assembly of FIG. 4.

FIG. 5 is a profile view of the embodiment of the skull assembly of FIG. 4. The skull assembly 400 can further have one or more actuators 430. The actuator 430 can rotate or extend to move an adjustment linkage 432 that is coupled to the smile magnets 424, for example. As the actuator 430 rotates, the adjustment linkage 432 can move the smile magnets 424 in the direction 426, changing the expression of the doll head 100. Additional actuators similar to the actuator 430 (e.g., the actuator 918 of FIG. 20) can be implemented to move other magnets 222 (e.g., the expression magnets 420). For example, such actuators can include servos, jack screws, etc., to move, for example, the expression magnets 420 and the smile magnets 424, in addition to other moveable elements such as the eyeball assemblies, eyelids 120, and the jaw region 218.

As shown in FIG. 4 and FIG. 5, the skull assembly 400 can have a pair of spaced-apart eye sockets 450 for receiving respective ones of the moveable eye assemblies 440 (e.g., the eye elements 40). The moveable eye assemblies 440 and eye sockets 450 can be aligned with the eye openings 30 and integral eyelids 120 formed in the face mask 110 when mounted on the skull assembly 400 (e.g., the face mask support 200). Movement of the moveable eye assemblies 440 can be mechanically and or magnetically controllable (e.g., with actuators).

The skull assembly 400 can further have a jaw assembly 460. The jaw assembly 460 can have a maxillary jaw 462, mandibular jaw 474, and teeth 466 and associated gingival. The jaw assembly 460 can move between an open position and a closed position based on movement of an associated actuator.

The skull assembly 400 can have a cavity 470 that is bounded or enclosed by rear skull support 404 and the face mask support 200. The cavity 470 can house the electronics 411, in addition to one or more processors, memories, actuators, etc. The electronics 411 can include at least some of the components described below in connection with FIG. 20.

FIG. 6 is a close up view of a portion of the skull assembly of FIG. 4 and FIG. 5. The view of FIG. 6 includes the eyelid support 442, separated from the face mask 110 as in FIG. 3 is included here, unlike the views of FIG. 4 and FIG. 5. The skull assembly 400 can have cutouts 412 formed in the cover portion 410, similar to the slots 220 (e.g., FIG. 4). The cutouts 412 can accommodate expression magnets 420 (shown as expression magnets 420a, 420b). The expression magnets 420 can be moved within the cutouts 412 to produce one or more expressions on the face mask 110. Only two expression magnets 420 are shown in the view of FIG. 6 but several others may be present as described above.

The eyelid support 442 is shown detached from the face mask 110 of FIG. 3 for ease of description. The eyelid support 442 may be affixed or otherwise adhered to the integral eyelids 120 of the face mask 110 as shown in FIG. 3.

The eyelid support 442 can have an eyelid support frame 446 coupled to an eyelid support shroud 444. The eyelid support shroud 444 can be in the shape of a portion of a sphere or a spheroid having a similar shape and contours of an eyeball element 448. In some embodiments, the shape of the eyelid support shroud 444 can be similar to the intersection of a sphere/spheroid and two planes displaced by an acute angle. Eyelid support frame 446 can have an annular or curved shape similar to the spherical or spheroid shape of the eyelid support shroud 444.

The eyelid support frame 446 can have a plurality of eyelid support connectors 452. Four eyelid support connectors 452a, 452b, 452c, 452d are shown, but this is not limiting to the disclosure (see FIG. 3). Any number of eyelid support connectors 452 can be implemented without departing from the scope of the disclosure. In FIG. 6, the eyelid support 442 can be (magnetically) coupled to the eyelid actuator assembly 441 (FIG. 4, FIG. 8) via the eyelid support connectors 452. As described herein, magnets (e.g., eyelid support magnets) are a primary example of fastening means implemented as the eyelid support connectors 452. However, other connectors or fastening means such as hook and loop fasteners, snaps, etc. can also be implemented for the eyelid support connectors 452.

Figure 8:
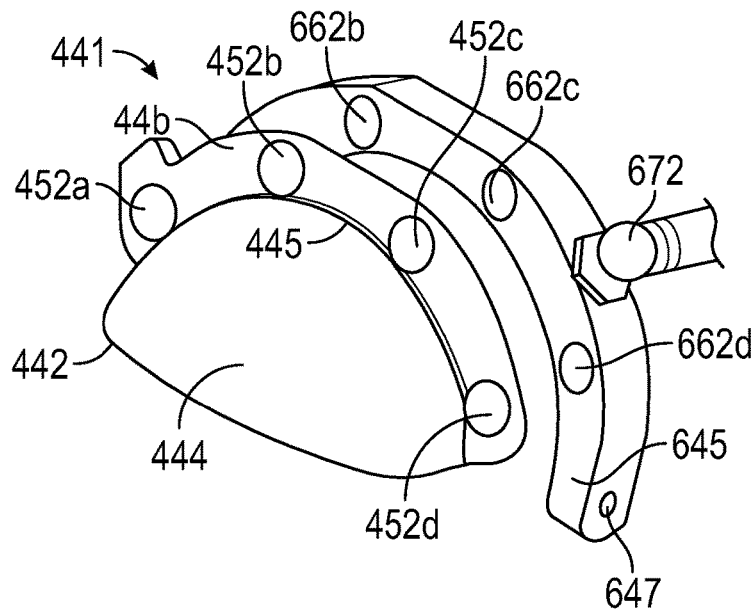
FIG. 8 is a top perspective view of the eyelid actuator assembly of FIG. 6 with the eyelid support shown spaced apart from the eyelid actuator assembly.
Figure 9:
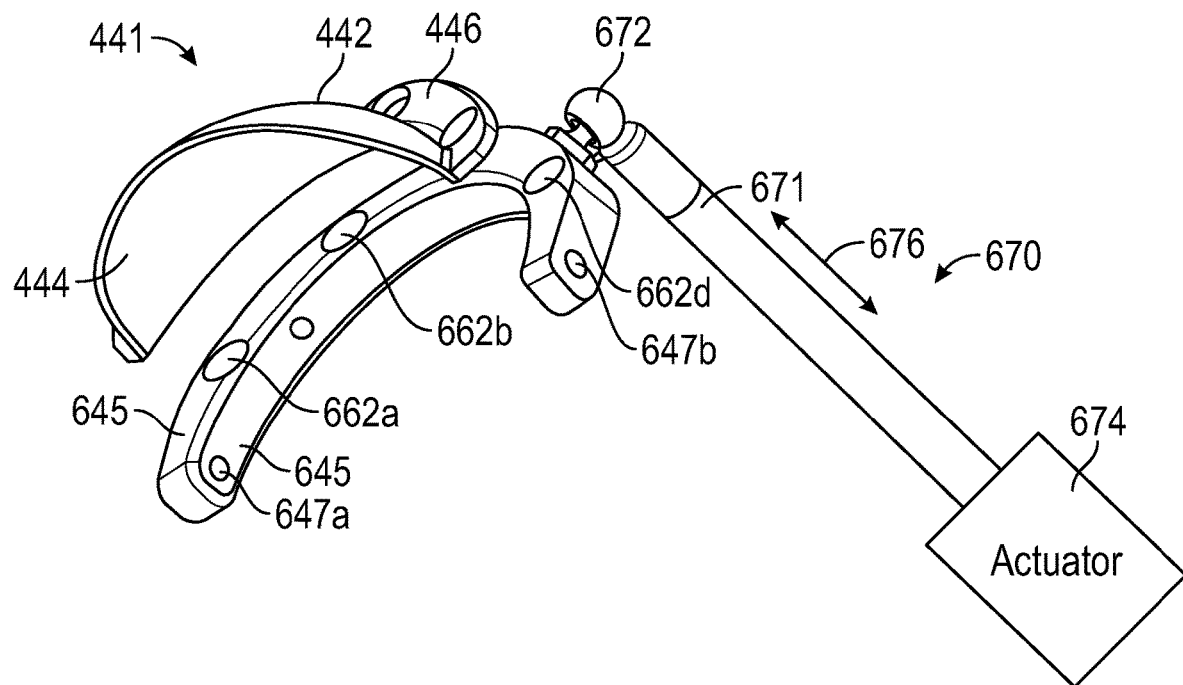
FIG. 9 is a bottom perspective view of the eyelid actuator assembly of FIG. 6 with the eyelid support shown spaced apart from the eyelid actuator assembly.

The eyelid support connectors 452 can be coupled to an eyelid drive band (drive band) 645 via corresponding drive band connectors 662 (FIG. 8, FIG. 9).

The drive band 645 can be a curved arm that follows the contours of the eyeball element 448 and moves the eyelid support frame 446 (and the eyelid support 442, in general) in a blinking motion (e.g., down in a direction out of the page). The drive band 645 can pivot in an arcuate path at pivot points 647 (also referred to herein as pivot 647). The pivot points 647 can be disposed on opposite sides of the eyeball element 448. The drive band 645 can be hingeably coupled to a larger hinge assembly 650 that lies on both sides of each moveable eye assembly 440. The eyelid support 442 is shown here, detached from the integral eyelids 120 and magnetically coupled to the drive band 645.

Instead of including eyelids as a component of the mechanical eyeball or moveable eye assembly 440, the eyelids 120 are integral to the face mask 110 and couple to internal mechanisms having a magnetic coupling that make the eyelid 120 move (e.g., open and close) in a more realistic manner.

Figure 7:
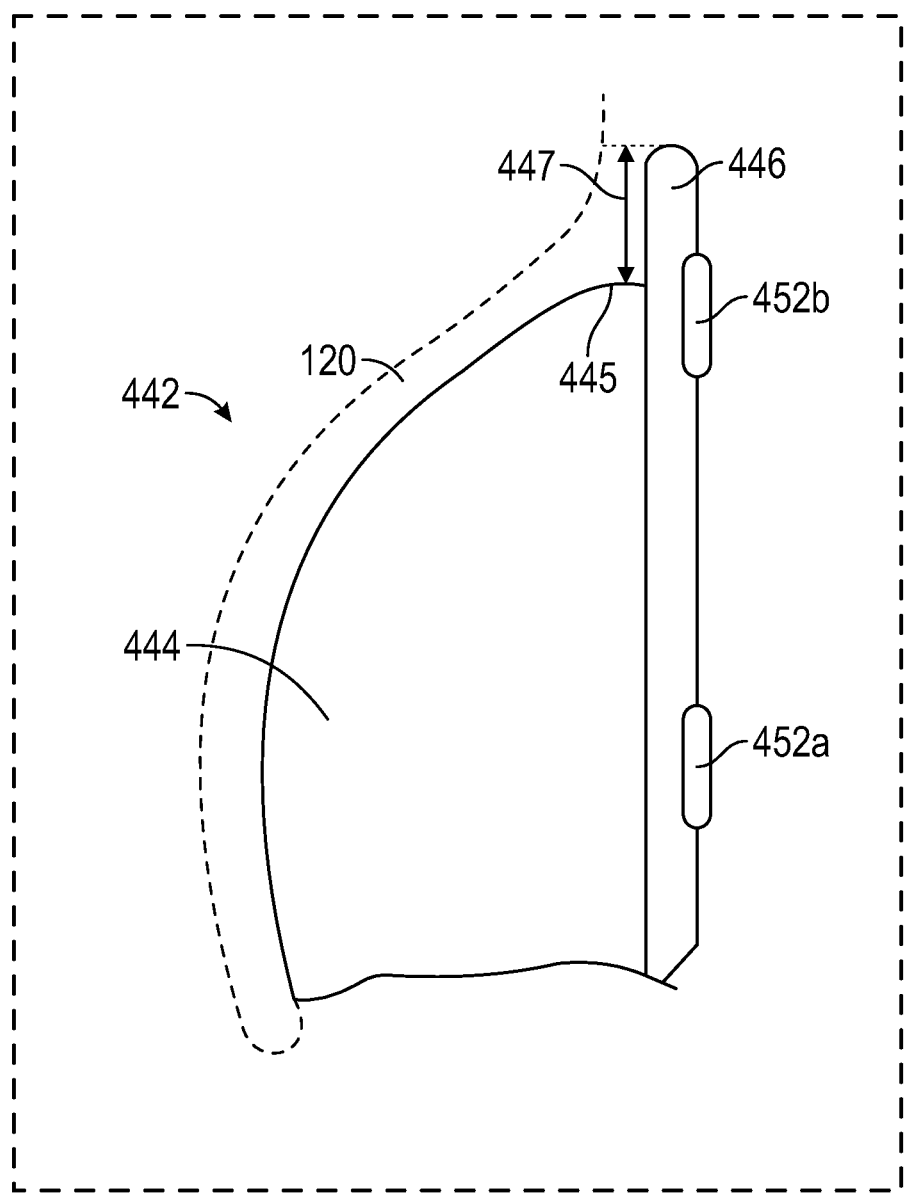
FIG. 7 is a cross section of the eyelid actuator taken along the line 7-7 of FIG. 3.

FIG. 7 is a cross section of the eyelid actuator taken along the line 7-7 of FIG. 3. The eyelid support shroud 444 of the eyelid support 442 can be affixed or otherwise adhered to the interior of the integral eyelids 120 of the face mask 110. The eyelid support shroud 444 can have a similar curved or substantially spherical (or spheroid) shape as the eyeball element 448 and form a realistic outward appearance of the eyelid 120. Thus the eyelid support shroud 444 in particular can provide an internal structure to, and form the outward appearance and shape of the eyelids 120. The eyelid support connectors 452*a*, 452*b* are shown in this view and are operable to magnetically couple to the drive band 645.

In some embodiments, the eyelid support frame 446 can extend away from an upper portion 445 of the eyelid support shroud 444. The eyelid support frame 446 can extend a distance 447 from the upper portion 445. The distance 447 can provide space to accommodate the eyelid support connectors 452 in addition to providing space to adhere the integral eyelid 120 to the eyelid support. The eyelid support frame 446 is shown disposed approximately orthogonally to the upper portion 445 of the eyelid support shroud 444, however this is not limiting on the disclosure. The angle at which the eyelid support frame 446 is coupled to the eyelid support shroud 444 can be acute or obtuse as needed to support realistic eyelid 120 shape and movement.

FIG. 8 is a top perspective view of the eyelid actuator assembly of FIG. 6 with the eyelid support shown spaced apart from the eyelid actuator assembly. The eyelid support 442 can have a tab 443 extending from the eyelid support frame 446. The tab 443 can be used to provide leverage to the eyelid support 442 and allow during removal of the eyelid support 442 or the face mask 110. The tab 443 can serve as a grab point to pull the eyelid support 442 from the drive band 645 to overcome the magnetic coupling.

FIG. 9 is a bottom perspective view of the eyelid actuator assembly of FIG. 6 with the eyelid support shown spaced apart from the eyelid actuator assembly. Reference is made to FIG. 8 and FIG. 9 in the following description. The eyelid support 442 is shown separated from the drive band 645. The drive band 645 can have one or more drive band connectors 662 (labeled as 662*a*, 662*b*, 662*c*, 662*d*). The drive band connectors 662 can couple the eyelid support frame 446 to the drive band 645 via the eyelid support connectors 452. The drive band connectors 662 can be implemented as magnets (e.g., drive band magnets) to magnetically couple the eyelid support 442 to the drive band 645. However, other connectors such as snaps or hook and look fasteners can also be implemented.

The coupling between the eyelid support connectors 452 and the drive band connectors 662 causes the integral eyelid 120 to blink to cover the eyeball element 448 as the drive band 645 moves. The (magnetic) coupling provides a strong and secure connection required to blink the integral eyelid 120. However, the magnetic coupling also permits removal of the face mask 110, and replacement as needed.

The drive band 645 can have a drive band coupling 672. The drive band coupling 672 can be coupled to a drive band actuator arm 671 that is part of a drive band actuator assembly 670. The drive band actuator assembly 670 can further have a drive band actuator 674 coupled to the drive band actuator arm 671 that can move the drive band actuator arm 671 (e.g., an actuator, a servo, or servo motor) in a direction described by an arrow (directions) 676. This can then move the drive band 645, the eyelid support 442 and the integral eyelid 120 in a blinking motion about a drive band pivot points 647*a* 647 (shown as pivots 647*a*, 647*b*). The drive band actuator 674 can also be coupled to one or more processors, microprocessors, a CPU, or other controller that can command movement of the actuator 674 (see, e.g., description of FIG. 20, below).

FIG. 10 is a front elevation view the moveable eye assemblies of FIG. 6.

Figure 11:
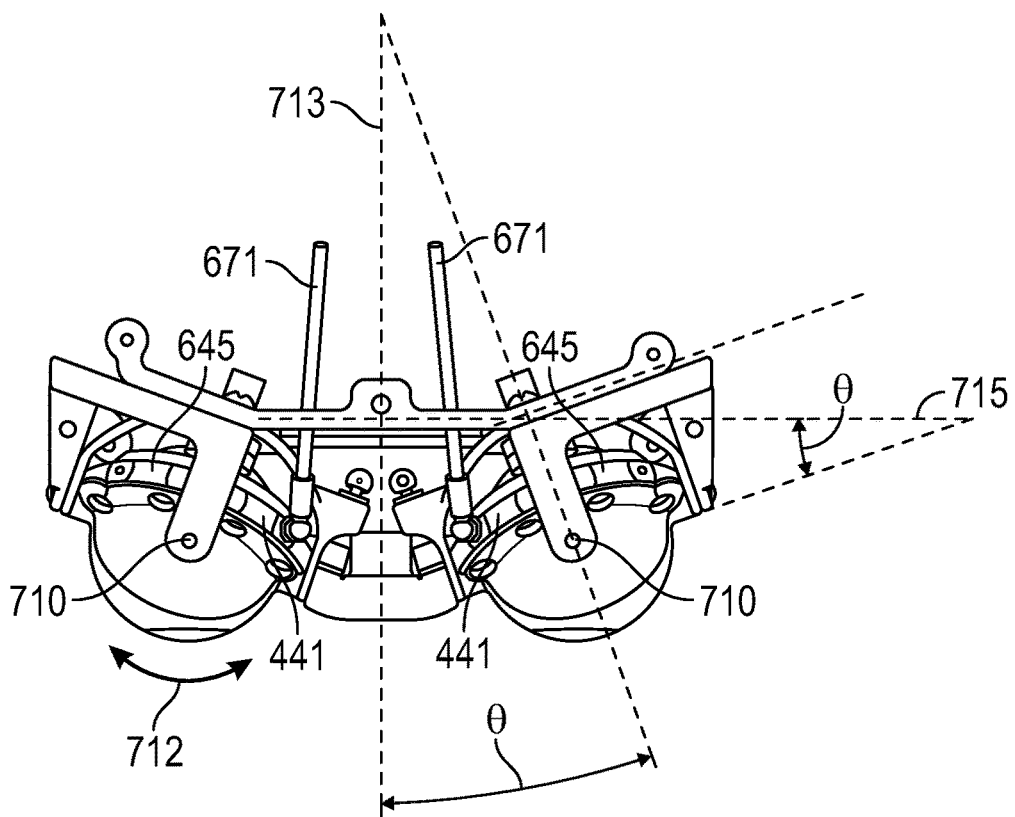
FIG. 11 is a plan view the moveable eye assemblies of FIG. 6.

FIG. 11 is a plan view the moveable eye assemblies of FIG. 6.

Figure 12:
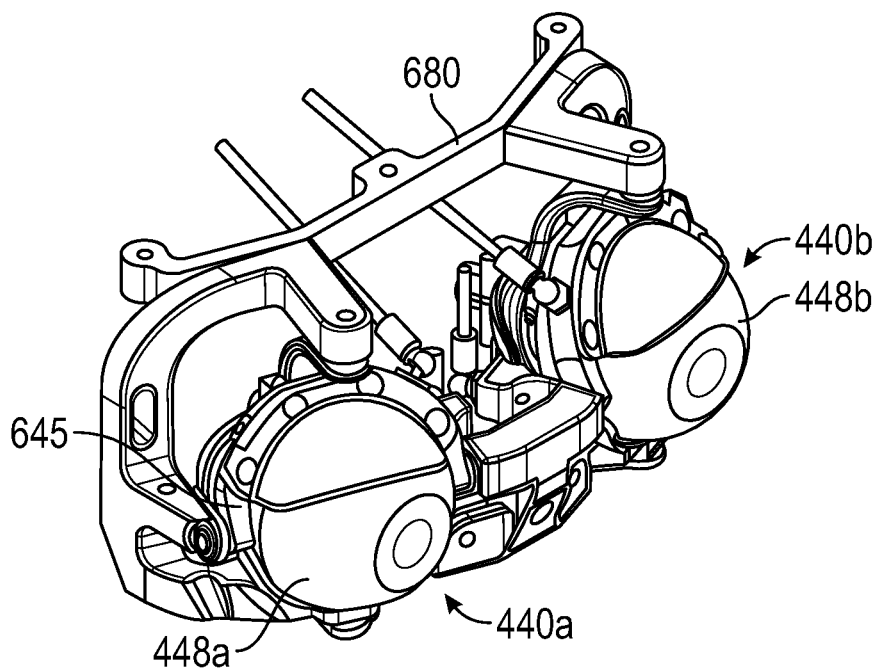
FIG. 12 is a perspective view the moveable eye assemblies of FIG. 6.

FIG. 12 is a perspective view the moveable eye assemblies of FIG. 6.

Figure 13:
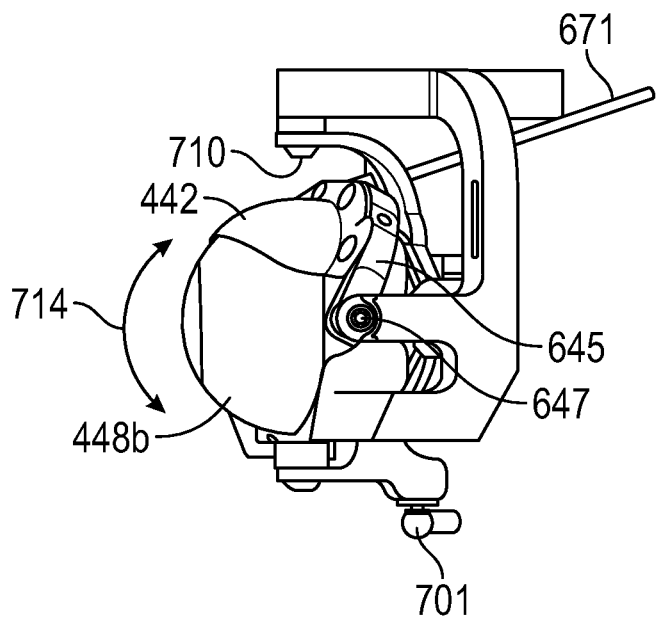
FIG. 13 is a side elevation view the moveable eye assemblies of FIG. 6.

FIG. 13 is a side elevation view the moveable eye assemblies of FIG. 6.

Reference is made to FIG. 10 through FIG. 13 in the following description. The moveable eye assembly 440*a* and the moveable eye assembly 440*b* are shown as a pair of left and right mechanical eyeballs and respective actuation components. The moveable eye assemblies 440 may generally be mirror images of each other. Accordingly, for ease of description, only one of the moveable eye assemblies 440 may be described in portions of the following description.

The moveable eye assemblies 440 can be displaced by an angle $\Theta$ (e.g., from the centerline 713 of the head) and affixed within an eyeball actuation frame 680. The eyeball actuation frame 680 can have an upper bridge 681 and a lower bridge 682 that provide structure and a mounting point for the various subcomponents of the moveable eye assemblies 440, The angular displacement can provide more realistic and more human-like eyeball placement and movement. The angle $\Theta$ can be anywhere in a range from 5 degrees to approximately 20 degrees. Twenty degrees may be used as a primary implementation for use with human doll heads. However, other embodiments can have other eye offsets, for example, allowing creation of animals, other creatures, aliens, etc. using the underlying eyeframe assembly (e.g., the eyeball actuation frame 680).

As shown in FIG. 11, the moveable eye assemblies 440 can be angled outward from an axial plane 715 by the angle θ. The integral eyelids 120 are tilted outward with the positioning of the moveable eye assembly 440 to provide a more realistic representation of the human form. For example, the integral eyelids 120 disposed on a single axis (e.g., facing perfectly forward) can limit the outer eye socket shape because of the mechanics required beneath the face mask 110 and the facemask support 200. The upper bridge 681 and lower bridge 682 can define the angle θ without having to change the operation or structure of the movable eye assembly 440. This arrangement can further simplify manufacturing and allow the moveable eye assemblies 440 to be offset as needed by using an upper bridge 681 and lower bridge 682 designed for a specific application or eyeball offset.

Figure 14:
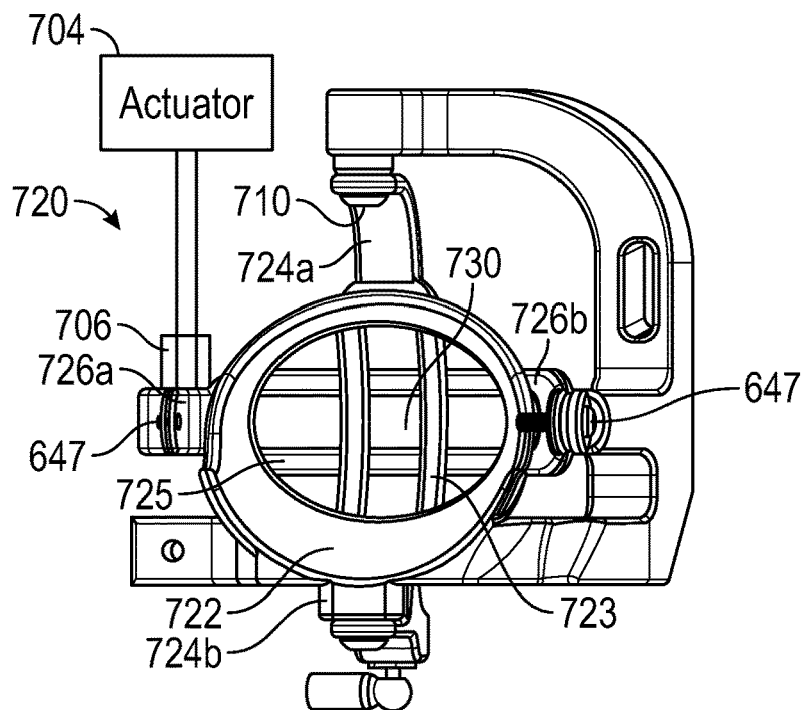
FIG. 14 is a front elevation view of the gimbal assembly of FIG. 10.

FIG. 14 is a front elevation view of the gimbal assembly of FIG. 10.

Figure 15:
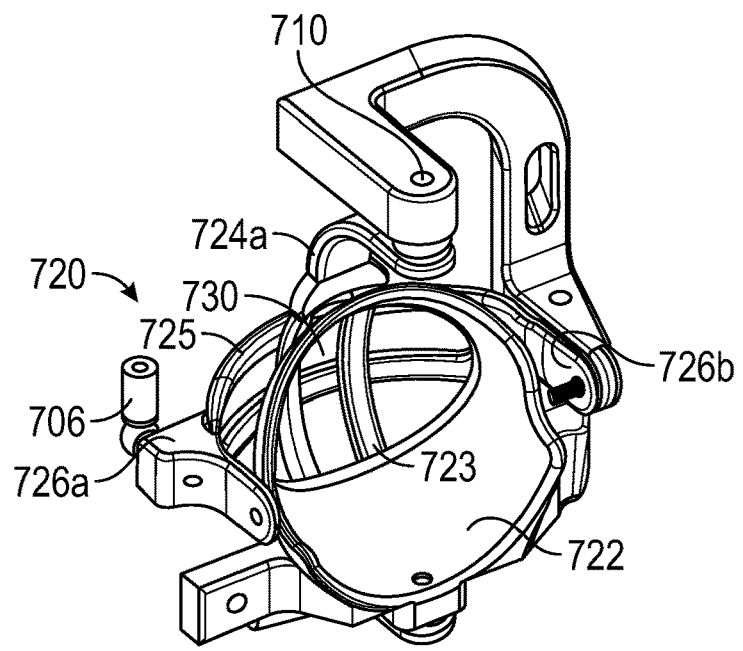
FIG. 15 is a perspective view of the gimbal assembly of FIG. 10.

FIG. 15 is a perspective view of the gimbal assembly of FIG. 10.

Figure 16:
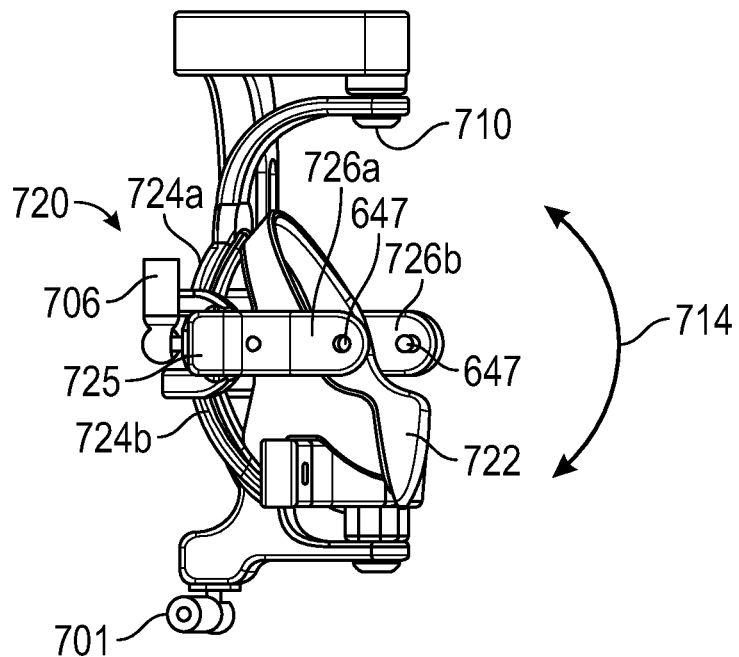
FIG. 16 is a side elevation view of the gimbal assembly of FIG. 10.

FIG. 16 is a side elevation view of the gimbal assembly of FIG. 10.

Reference is made to FIG. 14 through FIG. 16 for the following description. Each moveable eye assembly 440 can be coupled to a gimbal assembly 720 that provides movement for the moveable eye assemblies 440/eyeball elements 448 in pitch and yaw (e.g., rotation in two axes). The gimbal assembly 720 can include an eyeball cradle (cradle) 722.

The gimbal assembly 720 can have an eyeball cradle (cradle) 722. The cradle 722 can be formed to receive the eyeball element 448. In some implementations, the eyeball element 448 can be fit within the cradle 722 in an interference fit. In another implementation, the eyeball element 448 can be adhered to the cradle 722 as needed to secure it in place. In another implementation, the eyeball element 448 can be held in position within the by the pressure of the integral eyelid 120 and a hook on the back of the eyeball (e.g., rear eye support 812—FIG. 17). As the gimbal assembly 720 moves about the pivots 710 and the pivot 647, the eyeball element(s) 448 can move up and down, and left and right.

The cradle 722 can be coupled to a yaw arm 723. The yaw arm 723 can be formed as a vertical arc around the back of the eyeball element 448. The yaw arm 723 can have an upper yaw arm portion 724a and a lower yaw arm portion 724b. In some implementations, the yaw arm 723 can be formed as a pair of strap bands coupling the upper yaw arm portion 724a and the lower yaw arm portion 724b. The yaw arm 723 can be coupled to the pivots 710 and provide structure and support to the gimbal assembly 720 allowing horizontal or yaw motion of the eyeball element 448.

The gimbal assembly 720 can include a horizontal control linkage 701 (FIG. 10) coupled to the yaw arm 723 of adjacent moveable eye assemblies 440. The horizontal control linkage 701 of adjacent cradle(s) 722 of the adjacent moveable eye assemblies 440a, 440b can be coupled by one or more control arm 702. The control arm(s) 702 and the horizontal control linkage 701 can allow for coordinated eyeball movement (of the eyeball elements 448) to the left and right (e.g., yaw). The gimbal assembly 720 can have a pivot 710 about the vertical axis (yaw) of the eyeball elements 448.

The horizontal control linkage 701 can be coupled to an actuator 704 (shown as a functional block) to provide the left and right (yaw) movement of the eyeball elements 448 in the direction indicated by arrow 712. The pivot 710 is shown on both the top and bottom of the moveable eye assemblies 440. The yaw arm 723 can be coupled to the horizontal control linkage 701 and the actuator 704 providing the yaw motion (e.g., side to side).

The cradle 722 can further be coupled to a pitch arm 725. The pitch arm 725 can have a first pitch arm portion 726a and a second pitch arm portion 726b. The pitch arm 725 can form a horizontal arc around the back of the eyeball element 448 and be coupled to the pivot points 647 on both sides (e.g., left and right) of the gimbal assembly 720. In some implementations, the pitch arm 725 can be formed as a pair of strap bands coupling the first pitch arm portion 726a and the second pitch arm portion 726b.

The gimbal assembly 720 can further have a vertical control linkage 706 coupled to the pitch arm 725 for movement about the horizontal axis (pitch). The vertical control linkage 706 can also be coupled to a vertical actuator 707 (shown as a functional block) similar to the actuator 704 that can provide up and down rotation of the eyeball elements 448, about the horizontal axis. The movement of the eyeball elements 448 in the vertical direction (and about a horizontal axis), about the pivot points 647 is indicated by an arrow 714 in FIG. 13.

The pivot 710 and the pivot points 647 can allow left, right, up, and down movement of the eyeball elements 448. In some embodiments, the pivot points 647 can define the point about which the moveable eye assembly 440 pivots in the vertical plane and can also be coincident with the point about which the eyelid drive band 645 also pivots or rotates.

In some embodiments, the drive band 645 can pivot about the pivot points 647 along with (but independent of) the cradle 722 itself. The cradle 722 and the drive band 645 can be coupled to separate actuators and move independently. The cradle 722 can also have an open structure or aperture 730 in the rear portion of the gimbal assembly. The yaw arm 723 and the pitch arm 725 are formed to provide the aperture 730 in the back of the gimbal assembly 720. The aperture 730 can provide a pathway for certain cables or other wires for transmitting data and information to and from the eyeball element 448. In some embodiments, the eyeball element 448 can have an internal camera or other systems requiring power and information. The aperture 730 can allow one or more cables or wires to pass freely through the gimbal assembly 720 to any internal electronics within the eyeball element 448.

Figure 17:
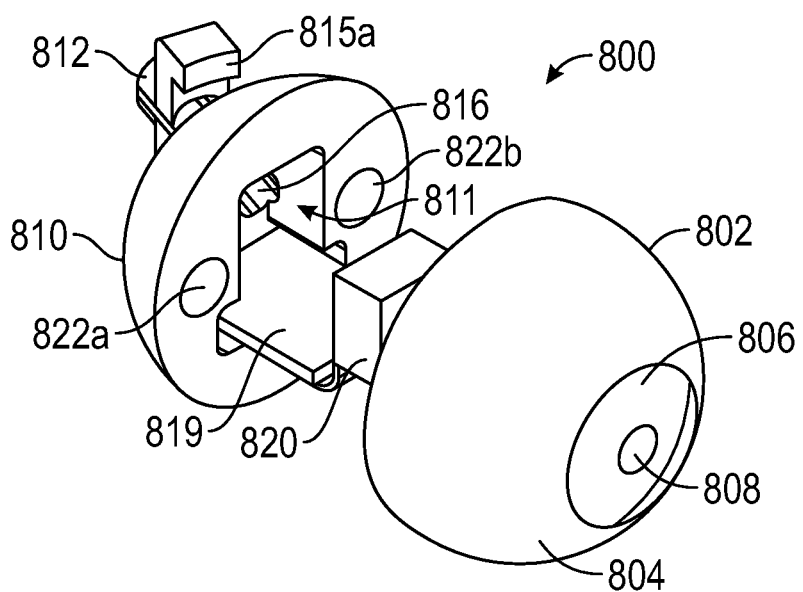
FIG. 17 is an exploded view of the moveable eye elements of FIG. 4 through FIG. 6 and FIG. 10 through FIG. 13.

FIG. 17 is an exploded view of the moveable eye elements of FIG. 4 through FIG. 6 and FIG. 10 through FIG. 13.

Figure 18:
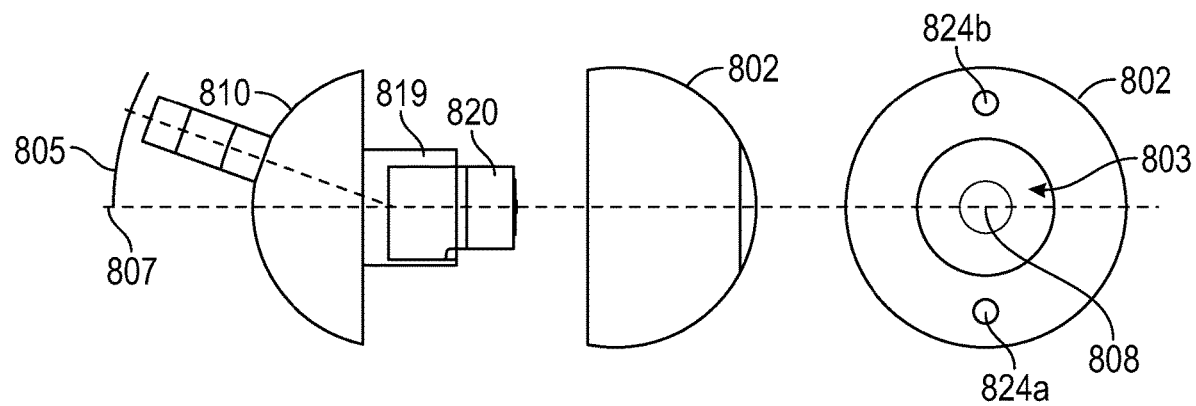
FIG. 18 is an exploded view of FIG. 17 view in top plan view.

FIG. 18 is an exploded view of FIG. 17 view in top plan view.

Figure 19:
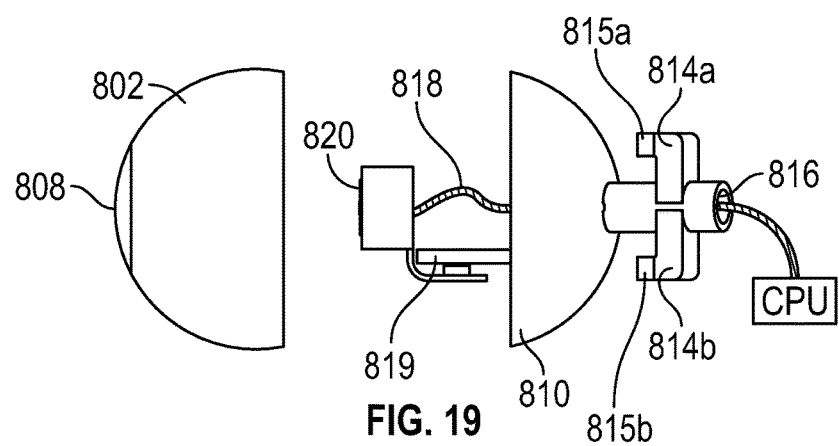
FIG. 19 is an exploded view of the eyeball of FIG. 17 view in side elevation view.

FIG. 19 is an exploded view of the eyeball of FIG. 17 view in side elevation view. Reference is made to FIG. 17 through FIG. 19 in the following description. The eye element(s) 480 can be an eyeball assembly (eyeball) 800. The eyeball 800 can have a front portion 802. The front portion 802 of the eyeball 800 can resemble a human eye having a sclera 804 (e.g., white of the eye), an iris 806, and a pupil element (pupil) 808.

In some embodiments, the sclera 804 can be formed of an opaque material, similar in color to an real (e.g., human) eye. The sclera 804 can further have graphics or internal structure that simulate blood vessels in a human eye.

In some embodiments, the iris 806 can have graphics including various details to replicate a human eye in addition to different colors. Thus, the front portion 802 can be removed and changed to effect a change in the color of the eyeball 800 (e.g., one or both eyeballs) in use in the doll head 100.

The pupil 808 can be formed of a clear (e.g., transparent) material allowing light to pass through the pupil 808. For example, this can allow an image capture device (camera) 820, internal to the eyeball 800, to capture video through the pupil 808. The front portion 802 can have an approximately hemispherical shape, similar to a human eyeball. The front portion 802 can further have a front cavity 803 on the interior. The front cavity 803 can accommodate certain electronics and other structures when combined with the rest of the eyeball 800, as described below.

The eyeball can have a rear portion 810. The front portion 802 (e.g., first portion) can be coupled to a rear portion 810 (e.g., a second portion) of the eyeball 800. The rear portion 810 can have a substantially hemispherical shape (e.g., spheroid) similar to a human eyeball. The rear portion 810 can have one or more first eyeball magnets 822 (shown as first eyeball magnets 822a, 822b). The first eyeball magnets 822a, 822b are shown on the rear portion 810 in FIG. 17. The front portion 802 can have corresponding second eyeball magnets 824 (shown as second eyeball magnets 824a, 824b) in FIG. 18. The front portion 802 can be magnetically coupled to the rear portion 810 via the one or more first eyeball magnets 822. Thus, in some embodiments, the first eyeball magnets 822 can be complementary to the second eyeball magnets 824 and allow user replacement of the front portion 802 of the eyeball 800 (e.g., to perform maintenance or change the color of the eye).

The rear portion 810 can further have a rear cavity 811 and a mounting platform 819 extending outward from the rear portion and toward the front portion. The mounting platform 819 can provide support for a camera 820 or other optical systems. The rear cavity 811 can accommodate certain electronics, such as the camera 820 and associated wires or cables. When the front portion 802 is joined to the rear portion 810, the rear cavity 811 can join with the front cavity 803 forming a void in the center of the eyeball 800. Thus, the camera 820 can be contained within the center of, or void within, the eyeball 800. The front cavity 803 can be further formed to receive the mounting platform 819 and the camera 820. The camera 820 (e.g., included within the void of each eyeball 800) can be implemented to provide face tracking, eye contact, face and object recognition, and navigation.

FIG. 18 also includes a rear view of the front portion 802 In addition to the top plan view of FIG. 17. The first eyeball magnets 822 and the second eyeball magnets 824 can secure the front portion 802 to the rear portion 810 of the eyeball 800 using attractive magnetic forces, similar to the magnets 222 and the magnets 322 described above.

In alternative implementations, only one of the front portion 802 and the rear portion 810 may have magnets (e.g., the first eyeball magnets 822 or the second eyeball magnets 824), instead implementing another metal or ferromagnetic material on the opposite portion to ensure magnetic coupling between the two portions of the eyeball 800. Thus instead of two sets of magnets using opposing magnetic force to couple the front portion 802 to the rear portion 810, only one set of magnets may be implemented on one of the front portion 802 to the rear portion 810. The user-replaceable front portion can allow for example, the user to change the color of the eyes of the doll head 100, or replace damaged parts within the eyeball 800.

In some other implementations, the front portion 802 can be coupled to the rear portion 810 using another kind of connector, such as hook and loop fastener, for example, instead of the first eyeball magnets 822 or the second eyeball magnets 824

The rear portion 810 can have a rear eye support 812. The rear eye support 812 can be a tubular structure formed or affixed to the rear portion 810. In some implementations, the rear eye support 812 can be operable to couple the rear portion 810 of the eyeball 800 to the gimbal assembly 720. The rear eye support 812 shown in FIG. 17 through FIG. 19 is displaced at an angle 805 away from a central axis 807 (FIG. 18) of the pupil 808. The central axis 807 can be coincident with a centerline of the eyeball 800 in the axial plane of the head. The angle 805 can be the same or similar angle as the angle Θ (FIG. 11). The angle 805 allows the pupil of the eyeball 800 to face normal to the head even though the eyeframe (e.g., the upper bridge 681 and the lower bridge 682) is angled from the normal plane of the doll head. The eyeball 800 shown can be implemented as the eyeball element 448a of FIG. 11, for example. The eyeball 800 implemented as the eyeball element 448b, for example, can have the rear eye support 812 displaced the same angle Θ in the opposite direction to account for the angle Θ between the moveable eye assemblies 440. In some implementations, the similar offset can aid in wiring and construction of the doll head 100.

The rear eye support 812 can have a hollow tubular center 816 (FIG. 19) that provides a path for a cable 818 to pass from the camera 820 (within the eyeball 800) to other electronics, such as a CPU (e.g., processor 904 of FIG. 20), within the doll head 100. The rear eye support 812 can extend from a rear side of the rear portion 810 (e.g., the back of the eyeball 800). The rear eye support 812 can further be offset at the angle Θ to match the offset of the moveable eye assemblies 440. The offset can generally be in the vertical plane, similar to that shown in FIG. 11.

The rear eye support 812 can also have retaining hooks 814 (shown as retaining hooks 814a, 814b) that couple the eyeball 800 to, for example, the gimbal assembly 720. The retaining hooks 814 can serve to retain the eyeball 800 within the cradle 722. The retaining hooks 814 can extend away from the rear eye support 812. In general, the retaining hooks 814 can extend orthogonally away from the rear eye support 812. The retaining hooks 814 can further have protrusions 815 (shown as protrusions 815a, 815b) configured to capture a portion of the gimbal assembly 720. For example, the protrusions 815 can capture at least a part of the yaw arm 723 or the pitch arm 725. The retaining hooks 814 can be further equipped with additional bearings (not shown) to reduce the resistance of the eyeball element 448 against the pitch arm 725.

Figure 20:
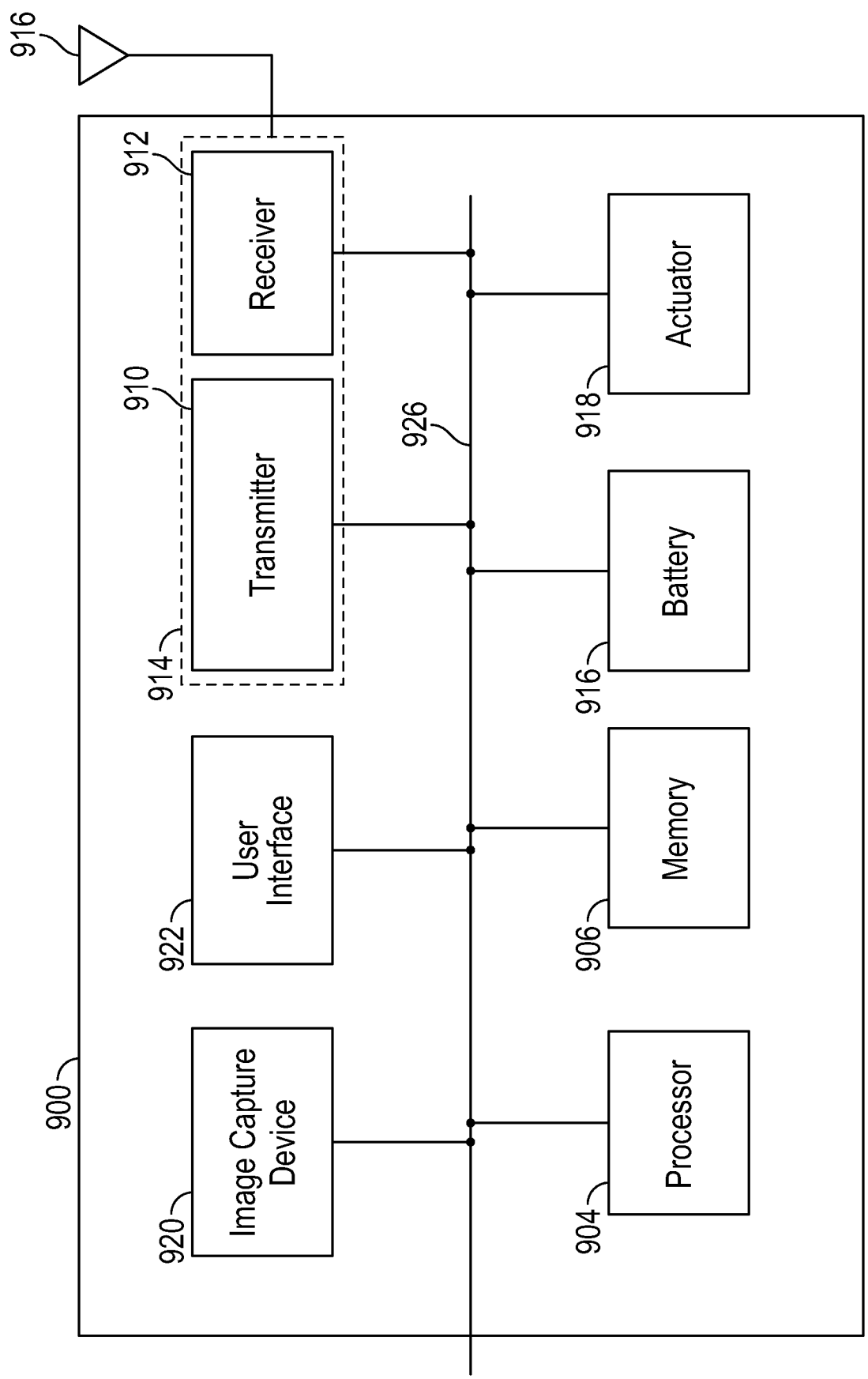
FIG. 20 is a functional block diagram of components of a control system that may be employed within the doll head and various subcomponents described above in connection with FIG. 1 through FIG. 19.

FIG. 20 is a functional block diagram of components of a control system that may be employed within the doll head and various subcomponents described above in connection with FIG. 1 through FIG. 19. A control system (system) 900 may include a processor 904 which controls operation of the system 900. The processor 904 may also be referred to as a central processing unit (CPU) such as the CPU described in connection with the foregoing description, for example. The processor 904 may be configured to process information from of a plurality of different components or sensors.

The processor 904 may comprise or be a component of a processing system implemented with one or more processors 904. The one or more processors 904 may be implemented with any combination of general-purpose microprocessors, microcontrollers, digital signal processors (DSPs), field programmable gate array (FPGAs), programmable logic devices (PLDs), neural processors, controllers, state machines, gated logic, discrete hardware components, dedicated hardware finite state machines, or any other suitable entities that can perform calculations or other manipulations of information.

The system 900 may further include a memory 906 operably connected to the processor 904, which may include both read-only memory (ROM) and random access memory (RAM), providing instructions and data to the processor 904. A portion of the memory 906 may also include non-volatile random access memory (NVRAM). The processor 904 typically performs logical and arithmetic operations based on program instructions stored within the memory 906. The instructions in the memory 906 may be executable to implement the various functions of the actuators or moveable eye assemblies 440. The memory 906 can also record and stored information and images or video captured by the camera 820, for example. The processor 904 can thus use information and images/video saved to the memory 906 to perform various AI processes allowing the doll head 100 to provide face/facial tracking, eye contact, face and object recognition, and navigation for an robotic body.

The memory 906 can include machine-readable media for storing software executable by the processor 902. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors 904, cause the processing system to perform the various functions described herein. For example, the processor 904 can command one or more actuators to move the moveable eye assemblies 440 or move the drive band 645 to cause the doll head 100 to blink.

The processor 904 can execute one or more artificial intelligence (AI) programming sequence to portray, for example, a human personality via the doll head 100. The processor 904 can store AI and machine learning (ML) algorithms to the memory 906. The processor 904 can further store information received via human interaction via the doll head 100 to the memory 906 for further AI and ML processes.

The system 900 may also include a transmitter 910 and a receiver 912 to allow transmission and reception of data between the system 900 and a remote location. The system 900 may also include (not shown) multiple transmitters, multiple receivers, multiple transceivers, and/or multiple antennas. The transmitter 910 and the receiver 912 can be combined as a transceiver 914.

The system 900 can include one or more plurality of adjustment mechanisms (actuators) 918. The actuators 918 can be electromechanical adjustment systems, servos, motors, solenoids, etc., operable to move one or more components of the doll head 100. In some embodiments, the actuators 918 can include an electric jack screw or a servo motor to move, for example, the smile magnets 424, the expression magnets 420, to blink the eyelids 120, or move the moveable eye assemblies 440 (e.g., the eyeball element 480) in pitch or yaw. Other movements to effect facial expressions for eyebrows are also possible using the actuators 918.

The actuators 918 can magnetically move or adjust respective ones of the plurality of the magnets 222. It may be appreciated that moving or adjusting any of the magnets 222 causes the corresponding magnets 322 to slide in its respective slot 220. The actuators 918 (e.g., individual adjustment mechanisms) can have a solenoid capable of generating a magnetic field when electricity is supplied.

The system 900 may further have an image capture device 920. The image capture device 920 can be one or more cameras to capture still or moving video. The processor 904 can use imagery captured by the image capture device 920 to perform various interactive tasks. The image capture device 920 can include the camera 820 enclosed within the eyeball 800.

The system 900 may further have a user interface 922. The user interface 922 may comprise a keypad, a microphone, a speaker, and/or a display. The user interface 922 can allow user interaction with the doll head 100. The user interface 922 may further include any element or component that conveys information to a user of the system 900 and/or receives input from the user.

In some implementations, a speaker of the user interface can project speech or words spoken by the doll head 100, in coordination with movement of the jaw (via the actuators 918), as if the doll head 100 was speaking. In addition, a user can interact with the doll head by speaking commands, queries, or other interactive statements. A microphone of the user interface 922 can receive the spoken words, and the processor 904 can perform appropriate tasks based on a particular AI or ML behavior.

The user interface 922 can also be coupled to the doll head 100 by wireless means via the transmitter 910 and the received 912, for example. The user interface 922 can allow a user to define or modify behaviors of the doll head 100, for example. The user interface 922 can further include a wired connector, serial connector (e.g., a universal serial bus (USB) connector or an ethernet connector) that can be used in addition to the wireless or can be used independently.

The system 900 can have a power supply 916. The power supply 916 can be, for example, a battery. The power supply 916 may be a rechargeable battery. In such an implementation, the battery can be a well-known rechargeable battery materials, such as Nickel-Cadmium (NiCd), Nickel-Metal Hydride (NiMH), Lithium-Ion (Li+), or Lithium-polymer (LiPo), among others.

The power supply 916 may be a disposable battery that is periodically replaced when electrical energy has been drained therefrom due to use. Thus, the power supply 916 can be any one of well-known non-rechargeable, disposable battery materials, such as an alkaline composition.

The various components of the system 900 described herein may be coupled together by a bus system 926. The bus system 926 may include a data bus, for example, as well as a power bus, a control signal bus, and a status signal bus in addition to the data bus. Those of skill in the art will appreciate the components of the system 900 may be coupled together or accept or provide inputs to each other using some other mechanism. The bus system 926 can further couple the system 900 to the camera 820 (e.g., the image capture device 920) and one or more actuators 918 implemented to move the eye elements 448 or blink the integral eyelids 120.

The system 900 can be implemented in various processes that provide a realistic interaction with the doll head 100. For example, the camera 920 can be used to control various behaviors of the doll head 100. The memory 906 can a plurality of behaviors for the robotic doll head 100. The processor 904 can performing a first behavior of the plurality of behaviors. The first behavior can include a spoken-word transmission from the user interface 922 of the doll head 100. The transmission can be accompanied by other behaviors including facial expressions, movement of the mouth and jaw of the doll head 100, in addition to movement of the eyeballs 800 (e.g., moveable eye assemblies 440). The camera 920 (e.g., the image capture device 820) can then receive at least one image or a video indicating a response from a user (e.g., a first response) to the first behavior performed at the doll head 100. The image or video can be accompanied by sounds received from the user at the doll head 100 (e.g., a verbal response from the user). The processor 904 (e.g., via one or more AI processes) can analyze the received audio and video as to determine an appropriate response. Accordingly the system 900 can allow a user to have verbal interactions with the doll head 100.

Such a method can include performing additional actions (e.g., a second behavior) based on responses from the user.

The responses performed by the doll head 100 can include, but are not limited to at least a blink of at least one eye, (e.g., a wink of one eye, or blink of both eyes), facial tracking of the user by the doll head 100 and moveable eye assemblies 440, a turn of the head (e.g., to enhance tracking of the user or eye contact with the user), facial recognition of the user, one or more spoken words transmitted from the doll head or received by the doll head, a movement of one or more facial features, a facial expression (e.g., a smile, a frown, etc.), and a movement of a mouth of the doll head (e.g., in coordination with a spoken word transmitted from the doll head).

Other interactions are also possible using the system 900.

OTHER ASPECTS

Reference throughout this specification to "one embodiment," "an embodiment," or "an implementation" means that a particular feature, structure, or characteristic described in connection with the embodiment is included in at least one embodiment or implementation. Thus, appearances of the phrases "in one embodiment" or "in an embodiment" or "in an implementation" in various places throughout this specification are not necessarily all referring to the same embodiment or implementation, nor are each embodiment or implementation mutually exclusive of one another. Furthermore, the particular features, structures, or characteristics described herein and above may be combined in any suitable manner in one or more embodiments or implementations.

The accompanying claims and their equivalents are intended to cover such forms or modifications as would fall within the scope of the disclosure. The various functional blocks illustrated in the figures (e.g., FIG. 20 and throughout) may be implemented as, for example, but not limited to, software and/or firmware on a processor or dedicated hardware. Also, the features and attributes of the specific example embodiments disclosed above may be combined in different ways to form additional embodiments, all of which fall within the scope of the disclosure.

The various illustrative functional blocks described in connection with the embodiments disclosed herein may be implemented as electro-mechanical components, electronic hardware, computer software, or combinations of both. To clearly illustrate this interchangeability of hardware and software, various illustrative components, blocks, modules, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present inventive concept.

The hardware used to implement the various illustrative logics, logical blocks, and modules described in connection with the various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read-only memory (ROM), electrically erasable programmable read-only memory (EEPROM), FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The previous description is provided to enable any person skilled in the art to practice the various aspects described herein. Various modifications to these aspects will be readily apparent to those skilled in the art, and the generic principles defined herein may be applied to other aspects.

Thus, the claims are not intended to be limited to the aspects shown herein, but is to be accorded the full scope consistent with the language claims, wherein reference to an element in the singular is not intended to mean "one and only one" unless specifically so stated, but rather "one or more."

The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A doll head comprising:
   a moveable eye assembly having an eyeball element;
   a face mask comprising an integral eyelid formed as a unitary component of the face mask;
   an eyelid support configured to receive the integral eyelid, the eyelid support including
      an eyelid support frame having an annular sector shape, spanning a portion of the eyeball element, the eyelid support frame having a plurality of eyelid support connectors, and
      an eyelid support shroud coupled to the eyelid support frame, the eyelid support shroud having shape similar to contours of the eyeball element and supporting an outward appearance of the integral eyelid; and
   a drive band having an annular shape complementary to the annular sector shape of the eyelid support frame, the drive band comprising a plurality of drive band connectors each disposed complementary to, and configured to magnetically couple with one of the plurality of eyelid support connectors.

2. The doll head of claim 1, wherein the integral eyelid is part of a continuous surface of the face mask, extending from a forehead and eyebrow region of the face mask.

3. The doll head of claim 1, wherein the eyelid support shroud is configured to be adhered to the integral eyelid.

4. The doll head of claim 1, further comprising:
   a drive band actuator coupled to the drive band and configured to move the drive band in an accurate path to blink the integral eyelid.

5. A doll head comprising:
   a face mask having a pair of integral eyelids;
   a pair of eyelid supports each coupled to an interior surface of each integral eyelid of the pair of integral eyelids, each eyelid support comprising an eyelid support frame having an annular sector shape, the eyelid support frame having a plurality of eyelid support connectors;
   a pair of eyelid actuator assemblies each having a drive band configured to magnetically couple to one of the pair of the eyelid supports and move the drive band in an arcuate path to blink the pair of integral eyelids, each band comprises an annular shape complementary to the annular sector shape of each respective eyelid support frame, each drive band comprising a plurality of drive band connectors each disposed complementary to, and configured to magnetically couple with one of the plurality of eyelid support connectors.

6. The doll head of claim 5 wherein the eyelid support comprises:
   an eyelid support shroud operable to receive the interior surface of the integral eyelid; and
   the eyelid support frame extending away from an upper portion of the eyelid support shroud.

7. The doll head of claim 5 further comprising a face mask support having:
   a plurality of first magnets disposed slidably within an outer surface of the face mask support and being adjustable over a range of positions, and
   a plurality of second magnets disposed in fixed positions on the outer surface of the face mask support.

8. The doll head of claim 7 wherein the face mask further comprises a plurality of third magnets complementary to the plurality of first magnets and the plurality of second magnets, the plurality of third magnets operable to secure the face mask to the face mask support,
   wherein movement of the plurality of first magnets causes complementary third magnets to move to form facial expressions in the face mask.

9. A doll head comprising:
   a face mask having a pair of integral eyelids;
   a pair of moveable eye assemblies, each moveable eye assembly of the pair of moveable eye assemblies having
      an eyeball element, and
      an eyelid actuator assembly having
         an eyelid support configured to be coupled to an interior surface of one integral eyelid of the pair of integral eyelids, the eyelid support comprising an eyelid support frame having an annular sector shape, the eyelid support frame having a plurality of eyelid support connectors, and
         a drive band configured to magnetically couple to the eyelid support and move the drive band in an arcuate path to blink the pair of integral eyelids, the drive band comprising an annular shape complementary to the annular sector shape of the eyelid support frame, the drive band comprising a plurality of drive band connectors each disposed complementary to and configured to magnetically couple with one of the plurality of eyelid support connectors; and
   an eyeball actuation frame coupling the pair of moveable eye assemblies, each moveable eye assembly being offset from a centerline of the doll head by a separation angle.

10. The doll head of claim 9 wherein the eyelid support comprises:
    an eyelid support shroud operable to receive the interior surface of each integral eyelid of the pair of integral eyelids; and
    the eyelid support frame extending away from an upper portion of the eyelid support shroud.

11. The doll head of claim 9 further comprising a face mask support having:
    a plurality of first magnets disposed slidably within an outer surface of the face mask support and being adjustable over a range of positions, and
    a plurality of second magnets disposed in fixed positions on the outer surface of the face mask support.

12. The doll head of claim 11 wherein the face mask further comprises a plurality of third magnets complementary to the plurality of first magnets and the plurality of second magnets, the plurality of third magnets operable to secure the face mask to the face mask support,
    wherein movement of the plurality of first magnets causes complementary third magnets to move to form facial expressions in the face mask.

* * * * *